US011244211B2

(12) United States Patent
Matsushima

(10) Patent No.: US 11,244,211 B2
(45) Date of Patent: Feb. 8, 2022

(54) PRINTING APPARATUS AND CONTROL METHOD

(71) Applicant: CANON KABUSHIKI KAISHA, Tokyo (JP)

(72) Inventor: Hiroki Matsushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/148,350

(22) Filed: Jan. 13, 2021

(65) Prior Publication Data

US 2021/0241051 A1 Aug. 5, 2021

(30) Foreign Application Priority Data

Jan. 30, 2020 (JP) .............................. JP2020-014080

(51) Int. Cl.
*G06K 15/02* (2006.01)
*G06K 15/16* (2006.01)
(52) U.S. Cl.
CPC .......... *G06K 15/021* (2013.01); *G06K 15/16* (2013.01); *G06K 15/1825* (2013.01); *G06K 15/1868* (2013.01)

(58) Field of Classification Search
None
See application file for complete search history.

(56) References Cited

U.S. PATENT DOCUMENTS

| 2005/0057593 | A1* | 3/2005 | Kachi ................ B41J 11/003 347/14 |
| 2015/0015919 | A1* | 1/2015 | Anderson ................ A23G 3/28 358/3.27 |
| 2020/0012910 | A1* | 1/2020 | Onoguchi ............ G06K 15/007 |

FOREIGN PATENT DOCUMENTS

JP 2004-009699 A 1/2004

* cited by examiner

*Primary Examiner* — Lennin R Rodriguezgonzalez
(74) *Attorney, Agent, or Firm* — Canon U.S.A., Inc. IP Division

(57) ABSTRACT

If it is determined that a recording medium is set in a first set portion and a recording medium is not set in a second set portion and a print target image is not included in a first region and a print target image is included in a second region in printing data, the printing data is edited so that the print target image included in the second region is printed onto the first set portion and is not printed onto the second set portion.

7 Claims, 23 Drawing Sheets

FIG.1
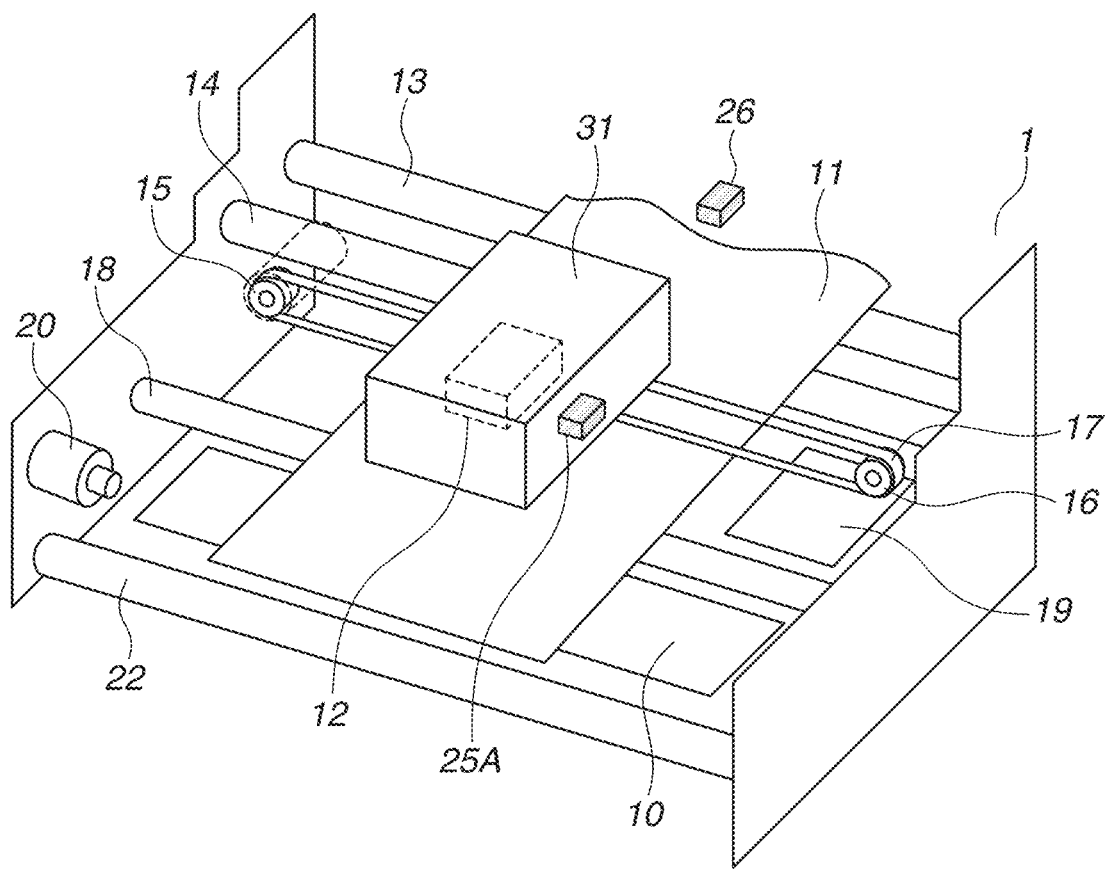
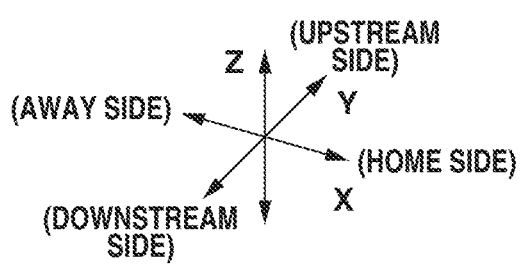

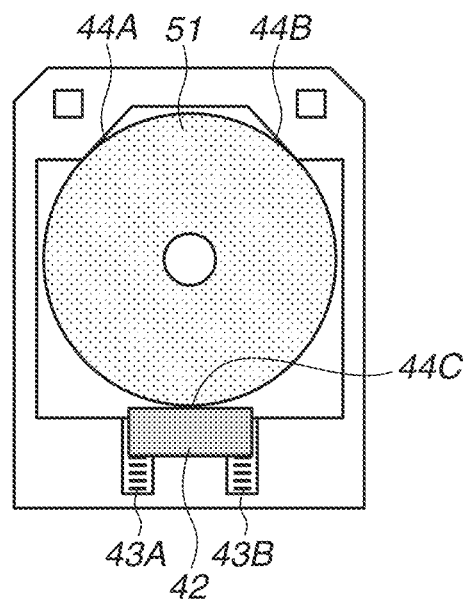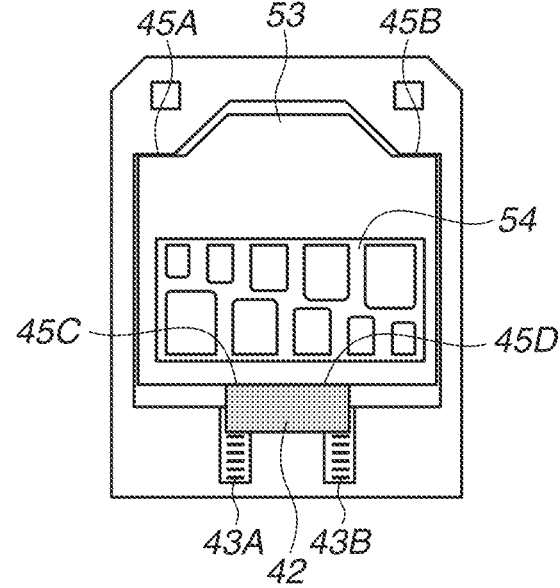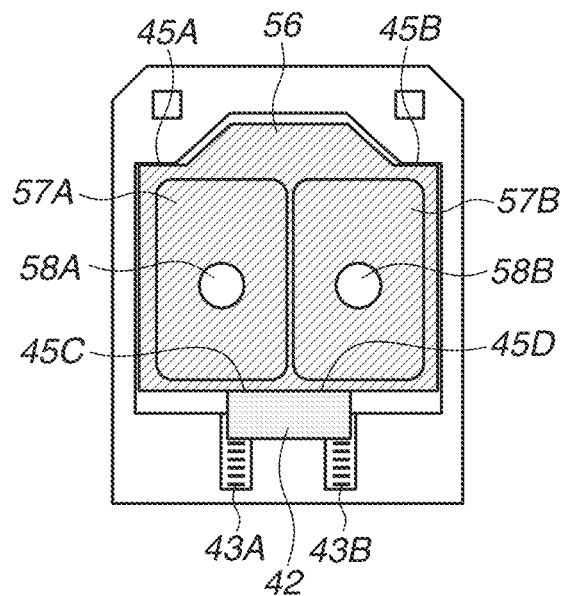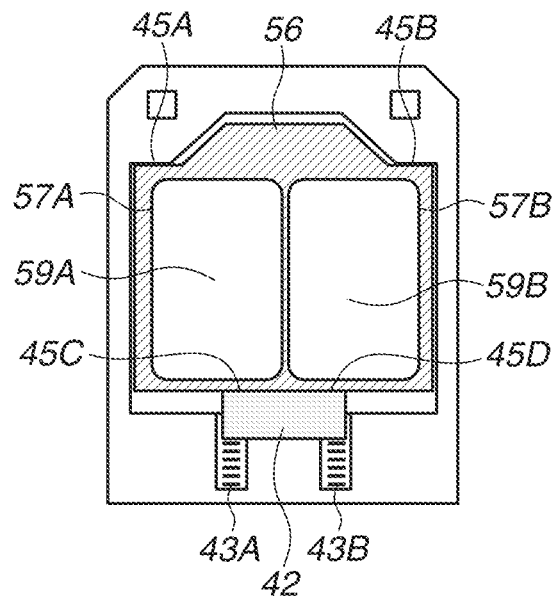

< TRAY SET STATE >

< TRAY CONVEYANCE STATE >

FIG.7
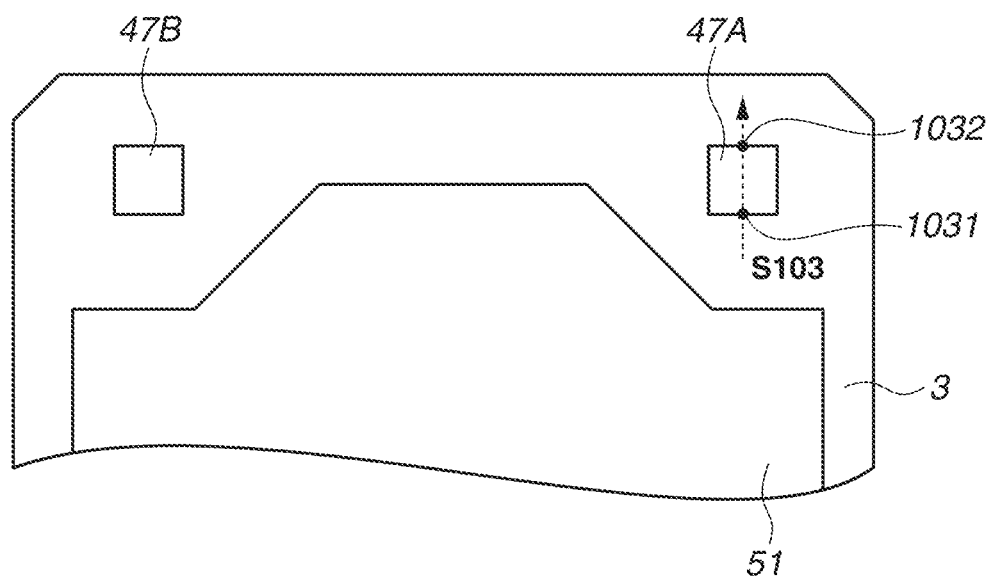
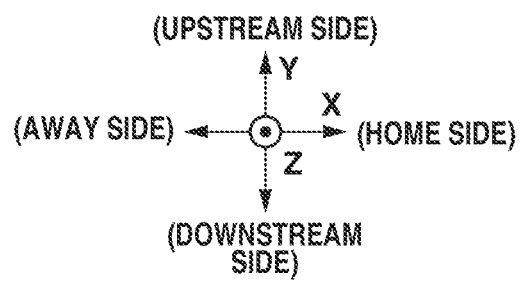

FIG.9
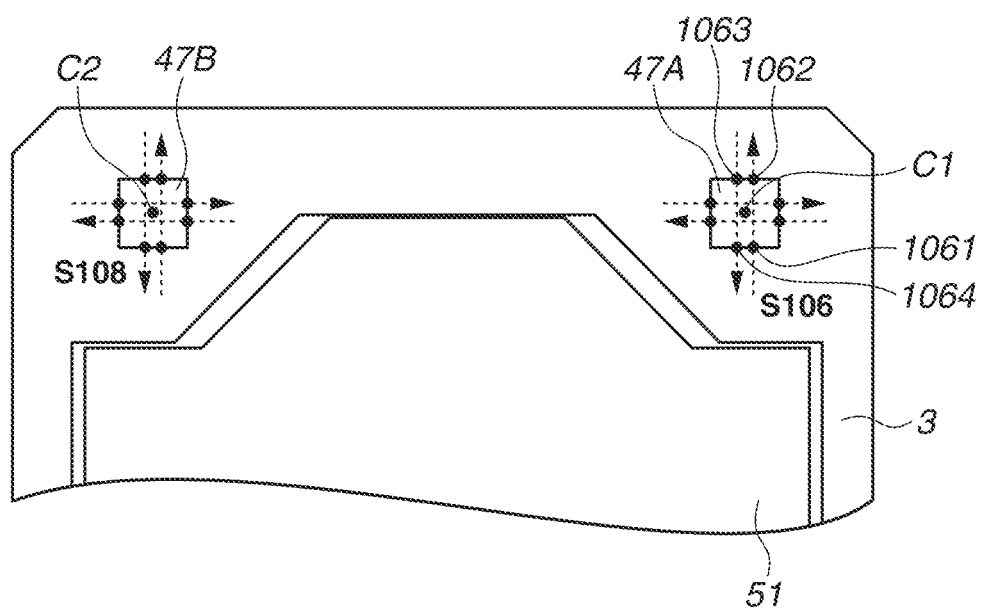
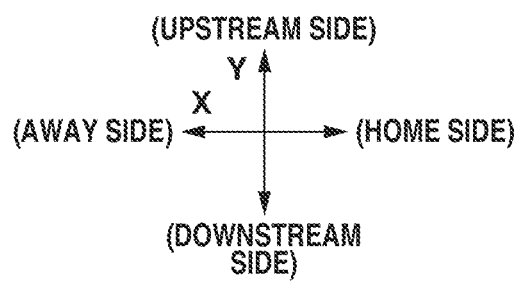

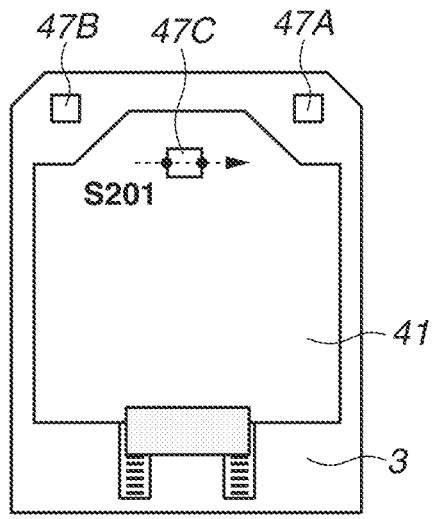
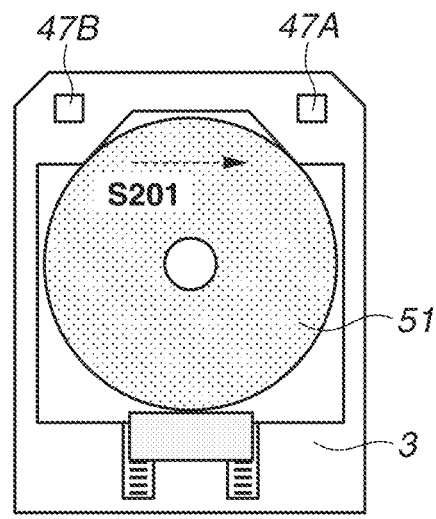
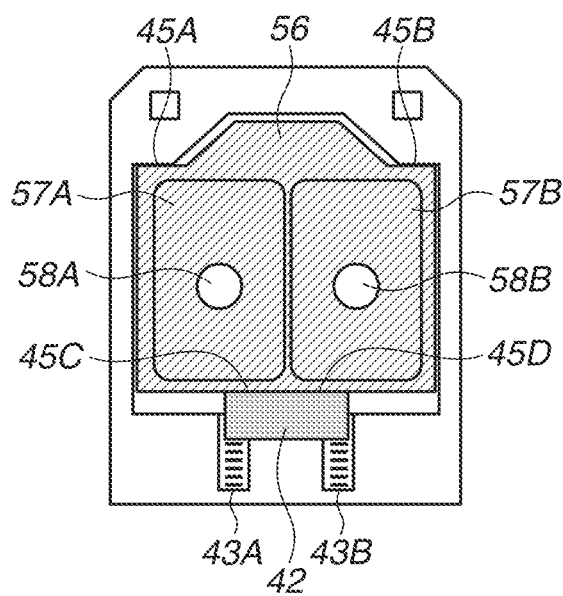
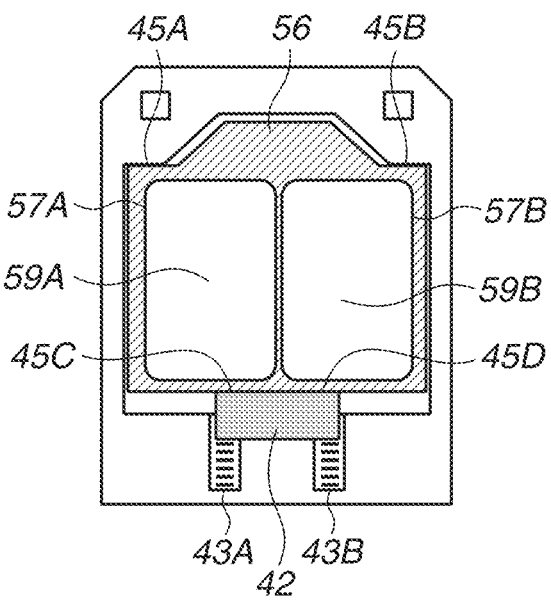

PRINTING APPARATUS AND CONTROL METHOD

BACKGROUND

Field of the Disclosure

The present disclosure relates to a printing apparatus that performs printing onto a printing medium.

Description of the Related Art

There has been a conventional function of a printing apparatus that performs printing onto a printing medium different from a normal sheet such as an optical disc. For example, a user causes the printing apparatus to perform printing onto the printing medium by setting a printing medium on a printing auxiliary member such as a dedicated tray, and inserting the printing auxiliary member into a main body of the printing apparatus.

Japanese Patent Application Laid-Open No. 2004-9699 discusses a recess portion suitable for a printing medium is provided on a tray, and a printing apparatus executes printing onto the printing medium set in the recess portion. The recess portion is provided with a reflection plate used to detect whether an optical disc is set therein. Japanese Patent Application Laid-Open No. 2004-9699 further discusses that the detection prevents ink from being discharged to the recess portion in which an optical disc is not set.

SUMMARY

According to embodiments of the present disclosure, a printing apparatus configured to print an image onto a recording medium includes a determination unit configured to determine whether the recording medium is set in each of first and second set portions in which the recording medium is to be set, an acquisition unit configured to acquire printing data including a first region corresponding to the first set portion and a second region corresponding to the second set portion, an editing unit configured to edit, in a case where it is determined by the determination unit that the recording medium is set in the first set portion and the recording medium is not set in the second set portion and a print target image is not included in the first region and a print target image is included in the second region in the printing data acquired by the acquisition unit, the printing data so that the print target image included in the second region is printed onto the first set portion and is not printed onto the second set portion, and a printing unit configured to perform printing based on the printing data edited by the editing unit.

Further features of the present disclosure will become apparent from the following description of exemplary embodiments with reference to the attached drawings.

BRIEF DESCRIPTION OF THE DRAWINGS

FIG. 1 is a perspective view illustrating a schematic configuration of a printing apparatus.

FIGS. 4A, 4B, 4C, and 4D are diagrams each illustrating the tray on which a printing medium is set.

FIG. 7 is a diagram illustrating the details of a reflection portion on the tray.

FIG. 9 is a diagram for illustrating an operation of first reflection portion detection.

FIGS. 11A, 11B, 11C, and 11D are top views of the tray for illustrating a third reflection portion detection operation.

DESCRIPTION OF THE EMBODIMENTS

Figure 2:
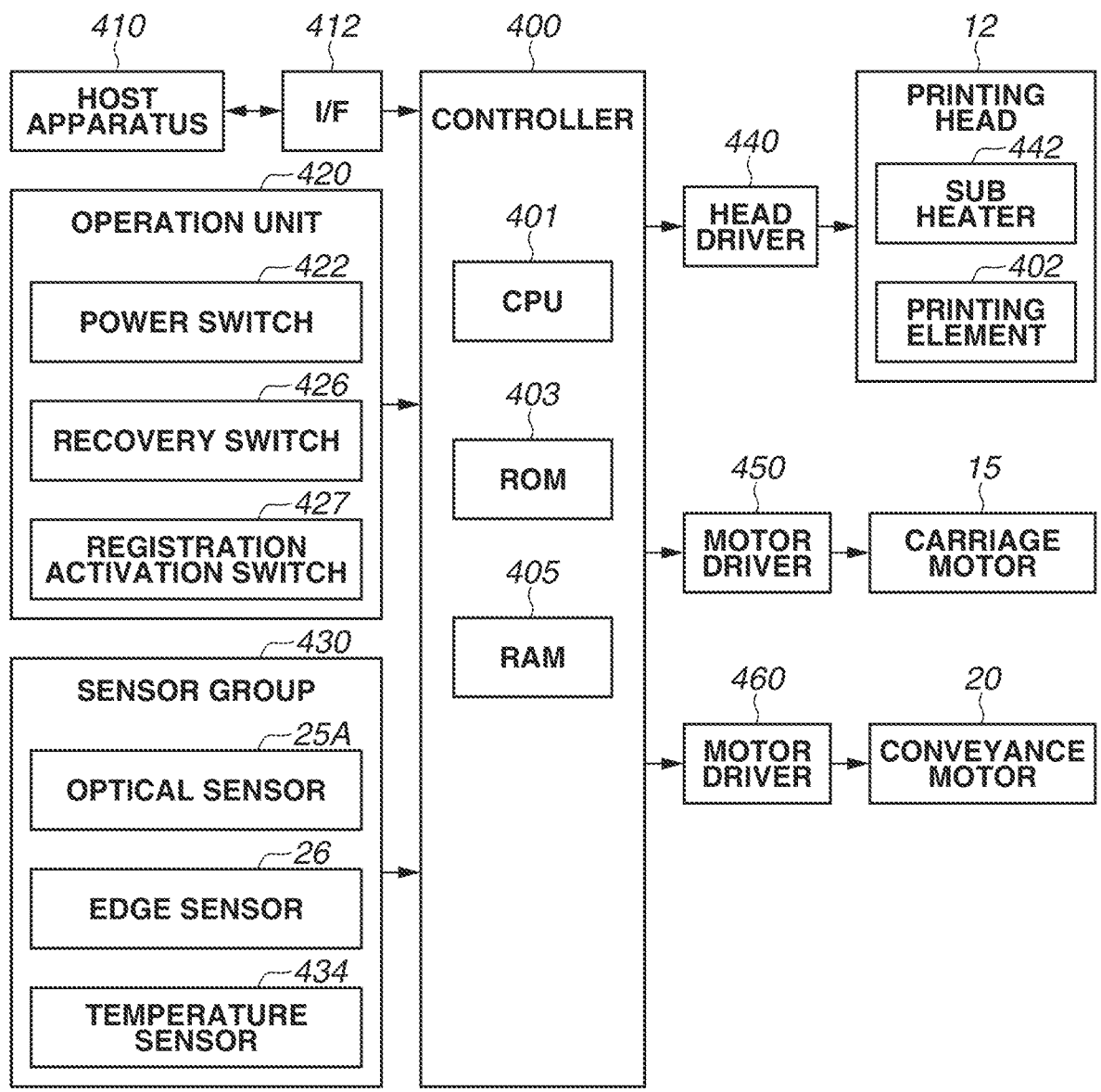
FIG. 2 is a block diagram illustrating a control configuration of the printing apparatus.

On a tray as discussed in Japanese Patent Application Laid-Open No. 2004-9699, for example, in a case where a user sets a printing medium in a set portion different from an intended set portion for the printing medium. In this case, if printing is stopped, printing onto the printing medium cannot be executed unless the user resets the printing medium in the intended set portion.

The present disclosure is directed to a technique that can execute appropriate printing even if the user erroneously sets a printing medium.

Hereinafter, exemplary embodiments for carrying out the technique of the present disclosure will be described with reference to the drawings.

Hereinafter, a first exemplary embodiment will be specifically described with reference to the drawings. The same reference numeral in the drawings indicates the same or corresponding portion.

FIG. 1 is a perspective view illustrating a schematic configuration of a printing apparatus. As illustrated in FIG. 1, in a printing apparatus 1, a carriage 31 includes one or a plurality of printing heads 12 (hereinafter, will be described as one printing head 12) at a position facing a printing medium 11. The carriage 31 is rotatably and slidably supported and guided by a guide shaft 14 serving as a guide member. A carriage motor 15 having a pulley is arranged at one end in a moving range of the carriage 31, and an idle pulley 16 is arranged at the other end. A timing belt 17 is stretched around the pulley of the carriage motor 15 and the idle pulley 16, and the carriage 31 and the timing belt 17 are coupled. To prevent the carriage 31 from rotating about the guide shaft 14, a support member 18 extending parallel to the guide shaft 14 is installed, and the carriage 31 is slidably supported by the support member 18. Furthermore, a maintenance mechanism 19 for performing maintenance of the printing head 12 is provided in a non-printing region. The maintenance mechanism 19 includes, for example, a cap (not illustrated) for sealing an opening of a nozzle of the printing head 12 during a non-printing time, and a wiper (not illustrated) for scraping off a foreign substance or excessive ink adhering to a nozzle surface. With such a configuration, the carriage 31 reciprocates along the guide shaft 14 in an arrow X direction (main-scanning direction) in FIG. 1, between one end and the other end in an axial direction of the guide shaft 14.

The printing medium 11 is conveyed in a direction (arrow Y direction in FIG. 1: conveyance direction) intersecting with a moving direction of the carriage 31 (arrow X direction in FIG. 1: main-scanning direction) using a first conveyance roller 13 and a second conveyance roller 22 that are driven by a conveyance motor 20. The roller axial direction of each of the first conveyance roller 13 and the second conveyance roller 22 is substantially parallel to the main-scanning direction. Hereinafter, when the first conveyance roller 13 and the second conveyance roller 22 are compared, in the conveyance direction, a side closer to the first conveyance roller 13 will be referred to as a upstream side in the conveyance direction, and a side closer to the second conveyance roller 22 will be referred to as a downstream side in the conveyance direction. In the conveyance direction, a region in which the carriage 31 moves is provided between the first conveyance roller 13 and the second conveyance roller 22.

In the printing apparatus 1, an edge sensor 26 that detects the printing medium 11 on a conveyance path is provided. The printing medium 11 is conveyed on a platen 10 in the conveyance direction (Y direction). An optical sensor 25A is attached to the carriage 31. The carriage 31 is movable in a direction (Z direction) vertical to a plane formed by the main-scanning direction (X direction) and the conveyance direction (Y direction).

FIG. 2 is a block diagram illustrating a control configuration of the printing apparatus 1 illustrated in FIG. 1. A controller 400 includes, for example, a central processing unit (CPU) 401 having a microcomputer configuration, a read-only memory (ROM) 403 storing programs, required tables, and other fixed data, and a random access memory (RAM) 405 provided with a work region and a region for loading image data. A host apparatus 410 is a supply source of image data and is connected to the printing apparatus 1, and may be in a form of a personal computer (PC) that performs generation and processing of image data, a scanner device for image reading, or a digital camera. Image data, other commands, and status signals are transmitted and received between the host apparatus 410 and the controller 400 via an interface (I/F) 412.

The following control performed by the printing apparatus 1 is executed by the CPU 401. Specifically, the control is implemented by the CPU 401 executing a program stored in the ROM 403, using the RAM 405 as a working memory.

An operation unit 420 includes a plurality of switches for receiving an instruction input by an operator. The plurality of switches includes a power switch 422, and a recovery switch 426 for issuing instructions of a maintenance operation of the printing head 12 and various printing operations.

A sensor group 430 includes a plurality of sensors for detecting a state of the printing apparatus 1. The plurality of sensors includes the optical sensor 25A mounted on the carriage 31, the edge sensor 26 that detects the printing medium 11 on the conveyance path, and a temperature sensor 434 provided at an appropriate region for detecting an environmental temperature.

A head driver 440 is a driver that drives a printing element 402 and a sub heater 442 in the printing head 12 based on printing data. The sub heater 442 is provided in the printing head 12 to adjust a temperature to stabilize ejection characteristics of ink.

A motor driver 450 is a driver that drives the carriage motor 15, and a motor driver 460 is a driver for driving the conveyance motor 20 used for conveying the printing medium 11.

Figure 3:
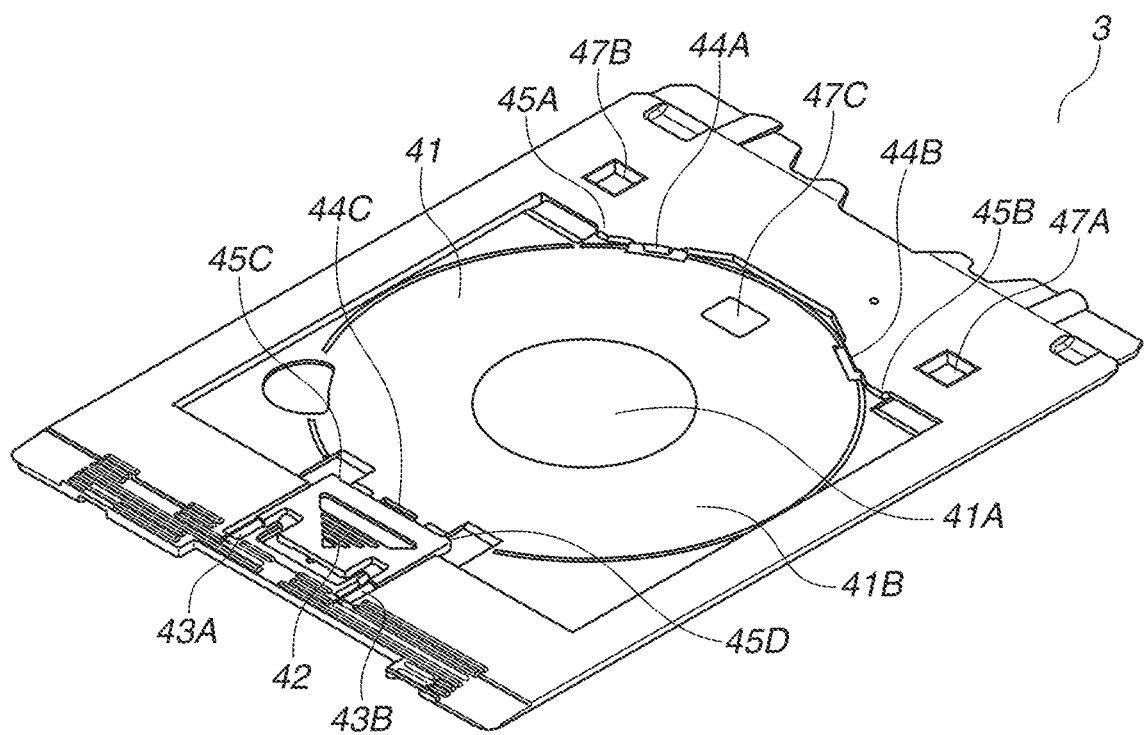
FIG. 3 is a diagram illustrating a configuration of a tray.

The printing medium 11 is conveyed in a state of being placed on a tray-shaped printing auxiliary member (hereinafter, referred to as a tray) 3. FIG. 3 is a diagram illustrating a configuration of the tray 3. The tray 3 includes a recess portion 41 in which the printing medium 11 is placed, a pressing member 42 that presses the printing medium 11, and elastic members 43A and 43B that generate a pressing force of the pressing member 42. The tray 3 further includes a first reflection portion 47A, a second reflection portion 47B, and a third reflection portion 47C. The optical sensor 25A receives diffuse-reflected light of light emitted by itself, and performs output depending on whether an amount of received light is large or small. In this example, an output of the optical sensor 25A becomes smaller as the amount of received light becomes larger. The first reflection portion 47A, the second reflection portion 47B, and the third reflection portion 47C reflect light emitted by the optical sensor 25A more easily than other portions of the tray 3. Thus, by checking an output of the optical sensor 25A, it is possible to detect the presence or absence and the position of each of the reflection portions. The detailed method for using each of the reflection portions will be described below.

FIGS. 4A, 4B, 4C, and 4D are diagrams each illustrating the tray 3 on which a printing medium is set. A plurality of types of printing media 11 can be individually placed on the tray 3. FIG. 4A illustrates a schematic top view in which an optical disc 51 is placed on the tray 3. FIG. 4B illustrates a schematic top view in which a nail sticker mount 53 is placed on the tray 3. FIG. 4C illustrates a schematic top view in which only a card mount 56 is placed on the tray 3, and FIG. 4D illustrates a schematic top view in which plastic card media (hereinafter, referred to as cards) 59A and 59B are placed on the card mount 56.

The optical disc 51 is a printable disc having a printing receiving layer on a surface thereof, for example. Examples of the optical disc 51 include a compact disc (CD), a digital versatile disc (DVD), and a Blu-ray (BD)® disc. The optical disc 51 is held onto the tray 3 by being in contact at outer edges with stopper portions 44A and 44B provided on the tray 3 and a stopper portion 44C provided on the pressing member 42.

A nail sticker 54 is placed on the nail sticker mount 53, and the nail sticker mount 53 is made of a plate-like plastic member. Nail stickers for nail art having different sizes are arrayed in the nail sticker 54. Because the nail sticker 54 has an ink receiving layer, the nail sticker 54 is printable. The nail sticker mount 53 is held onto the tray 3 by being in contact with stopper portions 45A and 45B provided on the tray 3 and stopper portions 45C and 45D provided on the pressing member 42.

The card mount 56 is a plate-like mount provided with set portions 57A and 57B having a recessed shape, and can hold the cards 59A and 59B by fitting the cards 59A and 59B into the set portions 57A and 57B. The cards 59A and 59B are printable printing media each having a credit card size, for example. An external shape of the card mount 56 is substantially the same as that of the nail sticker mount 53. The card mount 56 is held onto the tray 3 by being in contact with the stopper portions 45A and 45B provided on the tray 3, and the stopper portions 45C and 45D provided on the pressing member 42. In addition, the card mount 56 includes detection holes 58A and 58B that are to be used for determining the presence or absence of the cards 59A and 59B as described below.

Figure 6A:
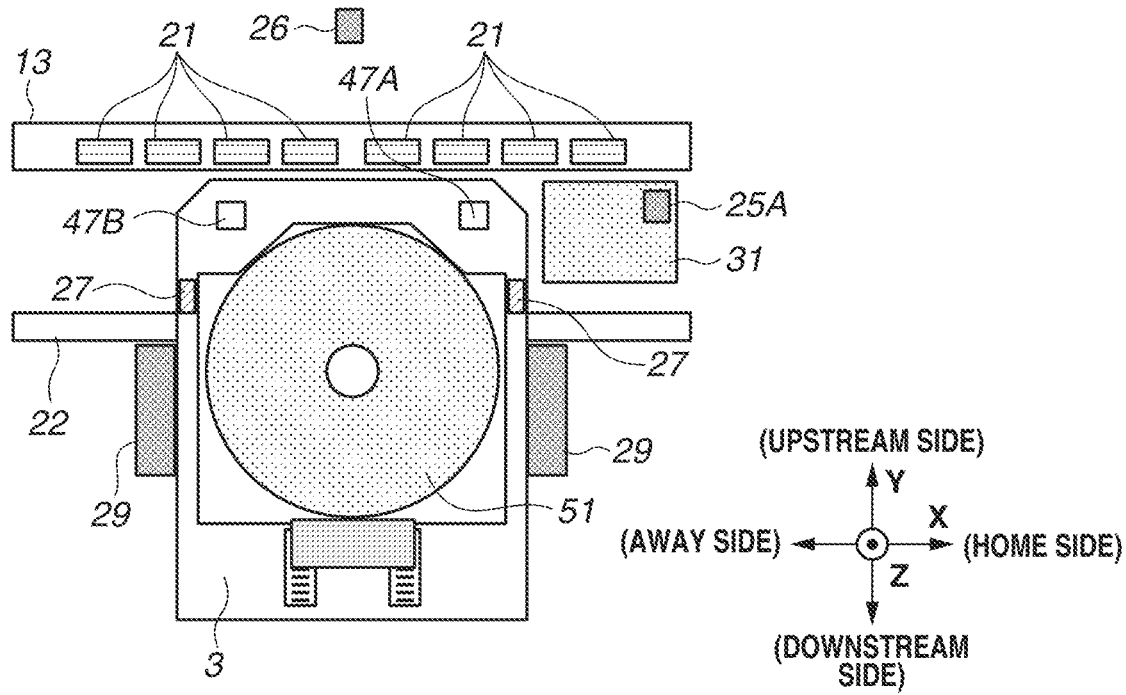
FIGS. 6A and 6B are diagrams illustrating a conveyance operation of the tray.
Figure 6B:
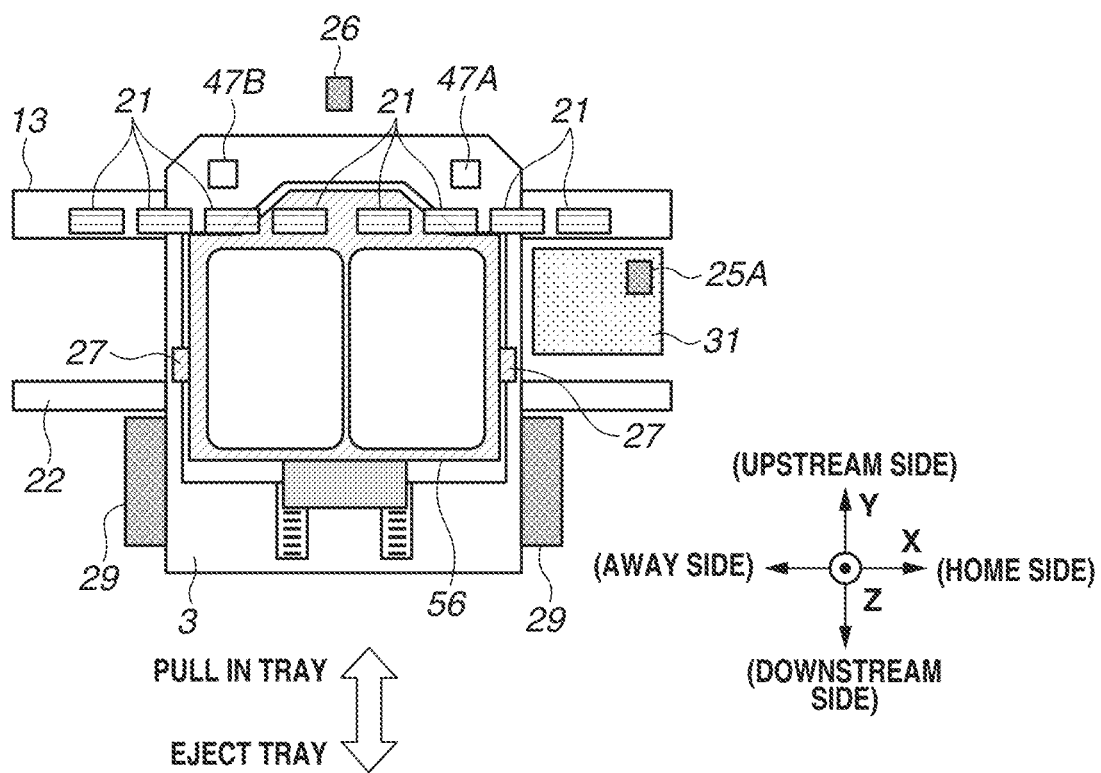

FIGS. 6A and 6B are diagrams illustrating a conveyance operation of the tray. FIG. 6A is a schematic top view illustrating a state in which the tray 3 is set in the printing apparatus 1 before a printing operation, and FIG. 6B is a schematic top view illustrating a state in which the tray 3 is being conveyed during the printing operation. As illustrated in FIG. 6A, before the printing operation, the tray 3 is set by the user into the printing apparatus 1 from a downstream side in the conveyance direction while being regulated by a tray guide 29 in the main-scanning direction (X direction in FIG. 6A). When the tray 3 is set, the tray 3 is in contact with the second conveyance roller 22, and is on the downstream side of the first conveyance roller 13.

As illustrated in FIGS. 6A and 6B, the first conveyance roller 13 and a first driven roller 21 are provided. If the first conveyance roller 13 rotates in a state in which a printing medium, such as a sheet, and the tray 3 are nipped by the first conveyance roller 13 and the first driven roller 21, the printing medium and the tray 3 are conveyed. The first driven roller 21 is driven to rotate by the rotation of the first conveyance roller 13. A plurality of first driven rollers 21 arranged in the main-scanning direction is provided. The tray 3 is conveyed in a state in which the entire region in the main-scanning direction of the tray 3 is nipped by the first driven rollers 21 and the first conveyance roller 13. As illustrated in FIGS. 6A and 6B, the second conveyance roller 22 is provided. Furthermore, two second driven rollers 27 are arranged to abut on the outside in the main-scanning direction of the recess portion 41 of the tray 3. The two second driven rollers 27 are provided symmetrically in the main-scanning direction with respect to a center line in the main-scanning direction of the tray 3. The two second driven rollers 27 are provided on the upstream side of the second conveyance roller 22. If the second conveyance roller 22 rotates in a state in which the tray 3 is held by the second driven rollers 27 and the second conveyance roller 22, the tray 3 is conveyed. In the conveyance, the second driven rollers 27 are driven to rotate by the rotation of the second conveyance roller 22. With the above-described configuration, if a printing operation is started, the tray 3 is conveyed by one or both of the first conveyance roller 13 and the second conveyance roller 22 as illustrated in FIG. 6B.

Subsequently, a printing operation of the printing medium 11 will be described with reference to FIGS. 5 to 23C. The following description will be given of an example case where the printing medium 11 in the drawings is the card mount 56 as one type of the printing medium 11.

Figure 5:
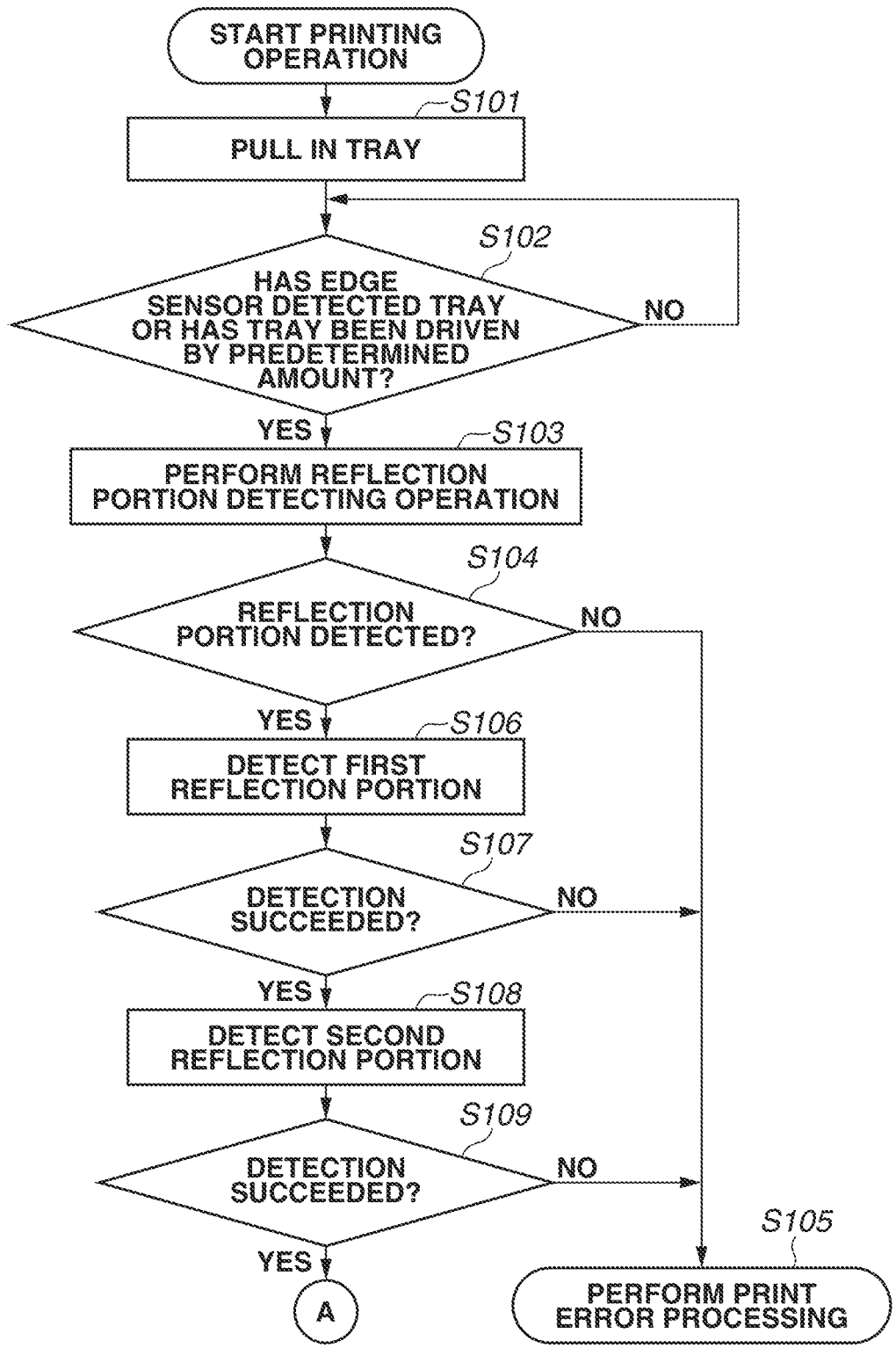
FIG. 5 is a flowchart illustrating an example of a printing operation.

FIG. 5 is a flowchart illustrating an example of a printing operation. Specifically, FIG. 5 illustrates processing starting from processing of pulling in the tray 3 in step S101 up to processing of determining a success in second reflection portion detection in step S109. The processing in each step of the flowchart in FIG. 5 and flowcharts to be described below is executed by the CPU 401. In addition, the processing illustrated in FIG. 5 is executed upon a printing operation being started in response to an instruction issued by the user on a display unit or an operation unit of the printing apparatus 1, or reception of a printing job including a print image by the printing apparatus 1.

If a printing operation is started, in step S101, by controlling the motor driver 460, the CPU 401 causes the conveyance motor 20 to execute an operation of pulling the tray, which is set in the printing apparatus 1, into the printing apparatus 1. By the processing in step S101, the tray 3 is conveyed toward the upstream side in the conveyance direction by the second conveyance roller 22 and the second driven rollers 27 (refer to FIG. 6A). As a result, a leading end on the upstream side in the conveyance direction of the tray 3 is nipped between the first conveyance roller 13 and the first driven rollers 21. After that, the tray 3 is conveyed by a roller pair of the first conveyance roller 13 and the first driven rollers 21, and a roller pair of the second conveyance roller 22 and the second driven rollers 27 (refer to FIG. 6B).

Next, in step S102, the CPU 401 determines whether the edge sensor 26 provided on the upstream side of the first conveyance roller 13 has detected the tray 3, or conveyance driving has been performed by a predetermined amount. If any of these conditions is satisfied (YES in step S102), the processing proceeds to step S103.

Next, in step S103, the CPU 401 performs a reflection portion detection operation for detecting the existence of the tray 3 by detecting the reflection portion provided on the tray 3. Details of the reflection portion detection operation in step S103 will be described with reference to FIG. 7. FIG. 7 is a diagram illustrating the details of the reflection portion on the tray 3.

In step S103, the CPU 401 moves the carriage 31 in the main-scanning direction based on a value prestored in the controller 400. Specifically, the CPU 401 moves the carriage 31 so that the position of the optical sensor 25A in the main-scanning direction comes to a position at which the first reflection portion 47A of the tray 3 is expected to exist, which is illustrated in FIG. 7. In addition, as illustrated in FIG. 7, the CPU 401 conveys the tray 3 so that the position of the first reflection portion 47A in the conveyance direction comes to the position of the optical sensor 25A. Then, the optical sensor 25A performs detection of the first reflection portion 47A. In the present exemplary embodiment, the description will be given of an example case where the carriage 31 moves in a state in which the tray 3 has been conveyed, but the conveyance and movement may be performed in a reverse order. Alternatively, the tray 3 and the carriage 31 may be simultaneously moved.

Figure 8:
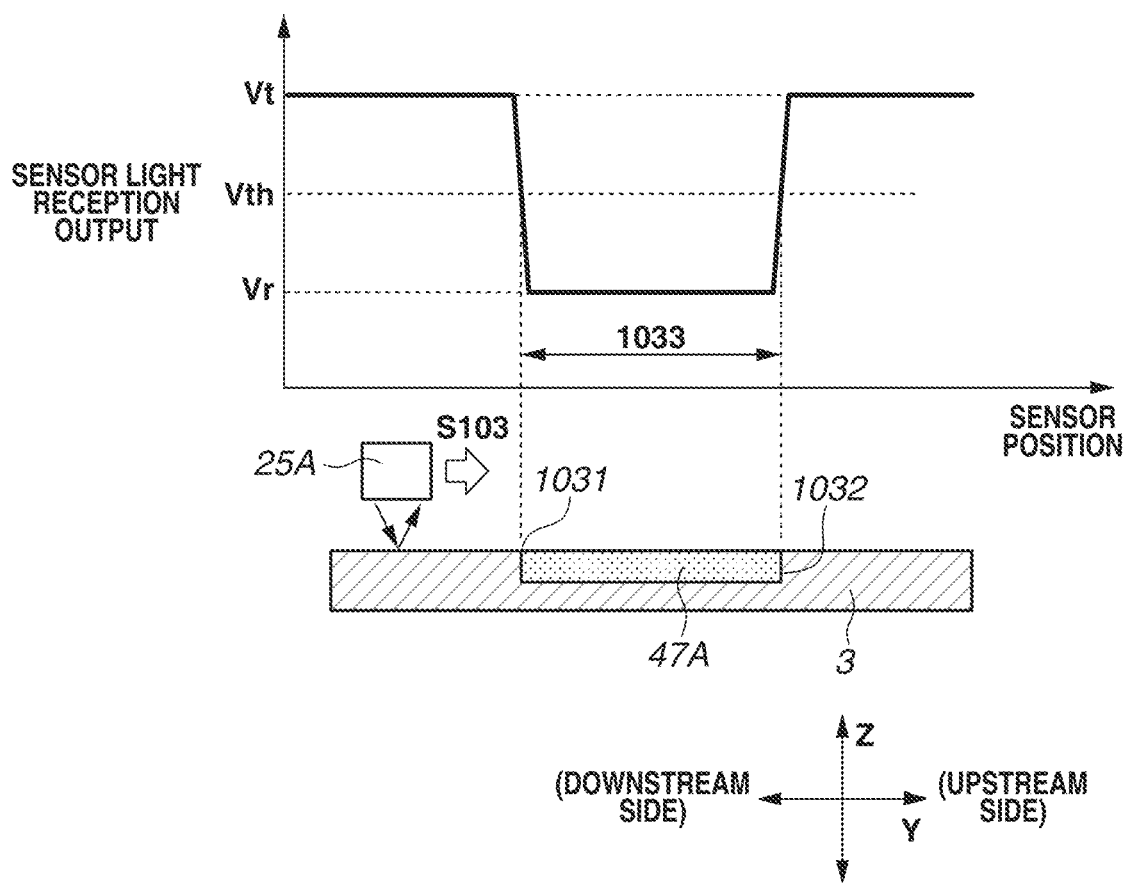
FIG. 8 is a diagram illustrating light reception output by an optical sensor in a reflection portion detection operation.

FIG. 8 is a diagram illustrating light reception output by the optical sensor 25A in the reflection portion detection operation in step S103. FIG. 8 illustrating a graph indicating an output relative to a position in the main-scanning direction of the optical sensor 25A, and a sectional side view illustrating a positional relationship between the optical sensor 25A and the tray 3 in the main-scanning direction. In the graph illustrated in FIG. 8, a value of the output becomes smaller as a received light amount becomes larger. As described above, the first reflection portion 47A reflects the light emitted by the optical sensor 25A more easily than the other portions of the tray 3. Thus, at the time of detection of the first reflection portion 47A, compared with the time of detection of the other portions of the tray 3, a received light amount of the optical sensor 25A becomes larger, and an output consequently becomes smaller. For this reason, as a result of the reflection portion detection operation in step S103, a graph as illustrated in FIG. 8 is obtained. Then, on the graph, the CPU 401 detects a change in the light reception output of the optical sensor 25A and detects a position at which the light reception output exceeds or falls below a predetermined threshold value Vth1. Then, positions of the optical sensor 25A that correspond to positions detected on the graph can be detected as positions of both ends 1031 and 1032 of the first reflection portion 47A.

If the above-described processing in step S103 is executed, in step S104, the CPU 401 further determines whether a reflection portion has been detected by the processing in step S103. Specifically, if the both ends 1031 and 1032 of the first reflection portion 47A have been detected as described above, and furthermore, a size 1033 in the conveyance direction of the first reflection portion 47A that can be calculated from the detection result falls within a predetermined range, the CPU 401 determines that the first reflection portion 47A has been detected. In this case, the CPU 401 recognizes that the predetermined tray 3 has been pulled in (YES in step S104), and continues the printing operation. On the other hand, if the both ends 1031 and 1032 of the first reflection portion 47A have not been detected, or the size 1033 in the conveyance direction of the first reflection portion 47A that can be calculated from the detection result falls outside the predetermined range, the CPU 401 cannot detect the first reflection portion 47A. Thus, the CPU 401 recognizes that the tray 3 has not been pulled in (NO in step S104). In this case, the processing proceeds to step S105. In step S105, the CPU 401 stops the printing operation due to a print error, performs an operation of ejecting the tray 3, and then issues an error notification to the user. Examples of methods of error notification include displaying an error message on the display unit provided on the printing apparatus 1.

If it is recognized that the tray 3 has been pulled in (YES in step S104), the processing proceeds to step S106. In step S106, as illustrated in FIG. 6B, the CPU 401 drives the first conveyance roller 13 to convey the tray 3 toward the upstream side in the conveyance direction by a predetermined amount, and performs first reflection portion detection of detecting the position of the first reflection portion 47A with higher precision than that in the processing in step S103. The operation of the first reflection portion detection in step S106 will be described with reference to FIG. 9.

In step S106, the CPU 401 moves the tray 3 to the downstream side in the conveyance direction in a state in which the position of the optical sensor 25A is fixed, and performs the detection of the first reflection portion 47A using the optical sensor 25A, similarly to the processing in step S103. Then, the CPU 401 detects both ends 1061 and 1062 in the conveyance direction of the first reflection portion 47A.

Next, by moving the tray 3 to the upstream side in the conveyance direction, the CPU 401 performs the detection of the first reflection portion 47A again using the optical sensor 25A, and detects both ends 1063 and 1064 in the conveyance direction of the first reflection portion 47A. Then, by calculating the center of the positions of the end 1061 on the downstream side and the end 1063 on the upstream side, the CPU 401 obtains a center in the conveyance direction of the first reflection portion 47A. For the sake of description about the conveyance direction, in FIG. 9, the positions of the ends 1062 and 1063 are shifted in the main-scanning direction, and the positions of the ends 1061 and 1064 are shifted in the main-scanning direction. However, in actuality, both ends exist at the same position in the main-scanning direction unless a conveyance error occurs.

The reason why the end on the upstream side and the end on the downstream side of the first reflection portion 47A are detected through a reciprocating operation of the optical sensor 25A in this manner is as follows. The above-described ends 1061 and 1063 are detection results obtained when the position in the conveyance direction of the optical sensor 25A falls within a range corresponding to the first reflection portion 47A in the conveyance direction. On the other hand, the ends 1062 and 1064 are detection results obtained when the position falls outside the range. In this manner, different tendencies can be seen in a sensor light reception output waveform between the case where the position falls within the range and the case where the position falls outside the range. Thus, even when the same end position in the conveyance direction is read in both of the cases, a slight systematic shift is generated. In view of the foregoing, the CPU 401 uses the ends 1601 and 1603 in calculation of the center position of the first reflection portion 47A, as the positions of both of the ends on the upstream side and the downstream side in the conveyance direction of the first reflection portion 47A. In other words, by using the positions detected when the position of the optical sensor 25A enters the range of the first reflection portion 47A as both of end positions on the upstream side and the downstream side, calculation accuracy of the center position of the first reflection portion 47A is improved.

Next, by conveying the tray 3, the CPU 401 moves the position in the conveyance direction of the optical sensor 25A to the center of the first reflection portion 47A that has been calculated in the above-described manner. Then, by the scanning of the carriage 31, the CPU 401 moves the position in the main-scanning direction of the optical sensor 25A by a predetermined amount from the first reflection portion 47A. Then, as illustrated in FIG. 9, through a reciprocating operation of the carriage 31, the CPU 401 calculates the center in the main-scanning direction of the first reflection portion 47A, similarly to the above-described calculation of the center in the conveyance direction. As a result of the above-described first reflection portion detection in step S106, the CPU 401 acquires a center position C1 of the first reflection portion 47A.

Next, in step S107, the CPU 401 determines whether the above-described first reflection portion detection in step S106 has succeeded. In step S107, similarly to step S104, if the ends of the first reflection portion 47A are not detected, or if the size of the first reflection portion 47A falls outside the predetermined range, it is determined that the predetermined tray 3 has not been pulled in (NO in step S107). In this case, the processing proceeds to step S105. In step S105, the CPU 401 stops the printing operation due to a print error, performs an operation of ejecting the tray 3, and then issues an error notification to the user.

If it is determined that the first reflection portion detection has succeeded (YES in step S107), the processing proceeds to step S108. Subsequently, in step S108, as illustrated in FIG. 9, the CPU 401 performs second reflection portion detection. Specifically, the CPU 401 moves the carriage 31 so that the position in the main-scanning direction of the optical sensor 25A comes to a position at which the second reflection portion 47B is expected to exist. Then, by control similar to the control in the first reflection portion detection (step S106), the CPU 401 performs processing for acquiring a center position C2 of the second reflection portion 47B. Then, in step S109, through processing similar to the processing in step S107, the CPU 401 determines whether the second reflection portion detection has succeeded. If it is determined that the second reflection portion detection has not succeeded (NO in step S109), the processing proceeds to step S105. In step S105, the CPU 401 stops the printing operation as a print error, performs an operation of ejecting the tray 3, and then issues an error notification to the user.

Compared with the reflection portion detection operation in step S103, the CPU 401 decreases a conveyance speed of the tray 3 in the first reflection portion detection in step S106 and the second reflection portion detection in step S108. This enhances detection accuracy of the end positions of the reflection portion, and eventually enhances the calculation accuracy of the center position of the reflection portion. In this example, for example, in the reflection portion detection operation (step S103), the conveyance speed of the tray 3 is set to 2.00 inch per second (ips), and in the first reflection portion detection (step S107) and the second reflection portion detection (step S110), the conveyance speed of the tray 3 is set to 0.67 ips.

Figure 10:
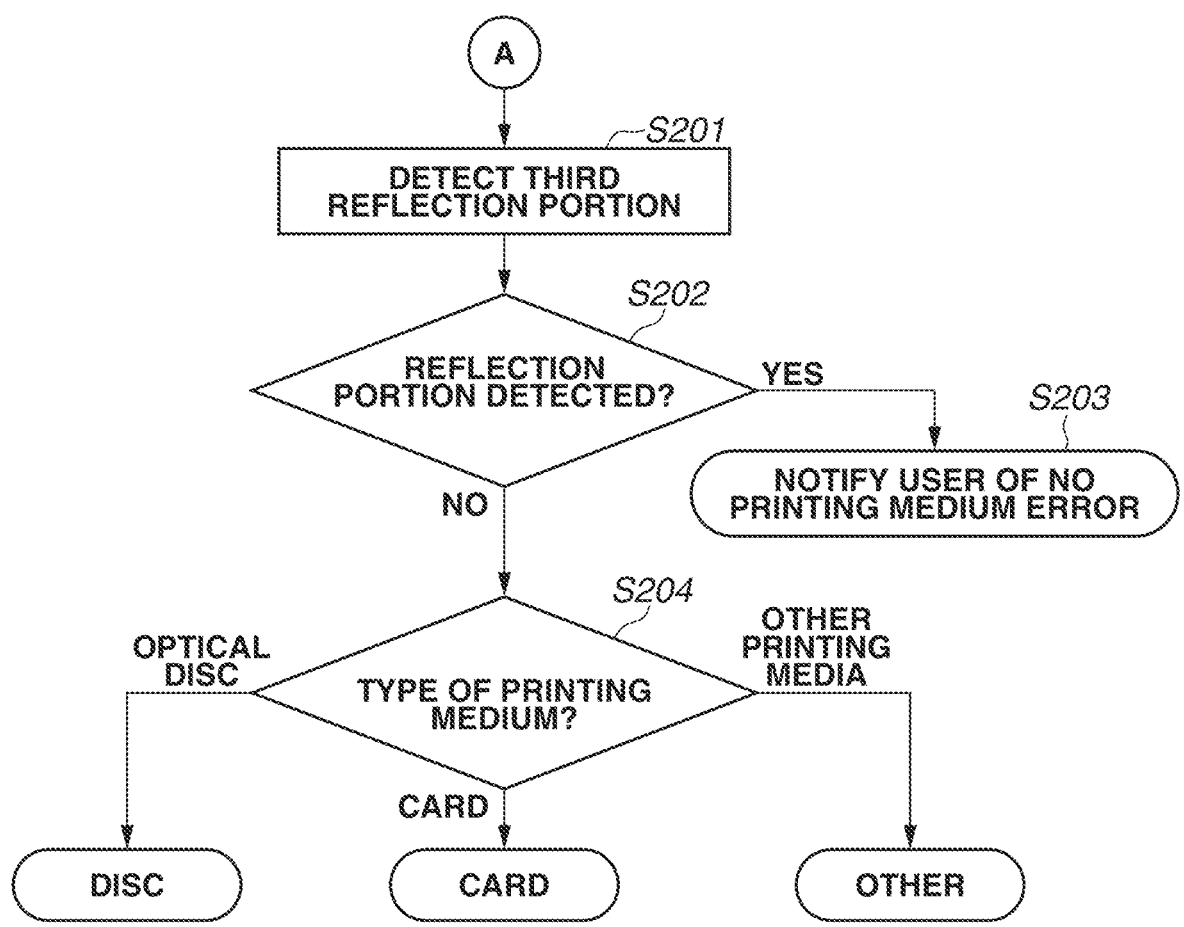
FIG. 10 is a flowchart illustrating processing of determining a type of a printing medium set on the tray.

If it is determined in step S109 that the detection has succeeded (YES in step S109), the processing illustrated in FIG. 10 is executed. FIG. 10 is a flowchart illustrating processing of determining the type of a printing medium set on the tray 3.

In step S201, the CPU 401 performs a third reflection portion detection operation for detecting the third reflection portion 47C illustrated in FIG. 3. FIGS. 11A, 11B, 11C, and 11D are top views of the tray 3 for illustrating the third reflection portion detection operation (step S201). In the third reflection portion detection operation (step S201), by conveying the tray 3 based on a value prestored in the controller 400, the CPU 401 moves the position in the conveyance direction of the optical sensor 25A to a position expected to be the center in the conveyance direction of the third reflection portion 47C. Then, through driving of the carriage 31, the CPU 401 moves the optical sensor 25A by a predetermined distance in the main-scanning direction relative to the third reflection portion 47C. Then, as illustrated in FIGS. 11A, 11B, 11C, and 11D, the CPU 401 moves the optical sensor 25A toward the opposite side in the main-scanning direction to detect the third reflection portion 47C. The detection method used at the time is similar to the method of the above-described reflection portion detection operation (step S103).

At this time, if a printing medium is not installed on the tray 3 as illustrated in FIG. 11A, the optical sensor 25A can detect the third reflection portion 47C. On the other hand, if a printing medium such as the optical disc 51 or the card mount 56 is installed on the tray 3 as illustrated in FIGS. 11B and 11C, since the third reflection portion 47C is hidden behind the printing medium, the optical sensor 25A cannot detect the third reflection portion 47C. In step S202, the CPU 401 determines whether the third reflection portion 47C has been detected by the processing in step S201. If the third reflection portion 47C has been detected (YES in step S202), the CPU 401 determines that the printing medium 11 is not placed on the tray 3, and the processing proceeds to step S203. In step S203, the CPU 401 performs print error processing. Specifically, the CPU 401 stops the printing operation, ejects the tray 3, and then notifies the user of a no printing medium error.

If the third reflection portion 47C has not been detected, and it is determined that the printing medium 11 is set (NO in step S202), the processing proceeds to step S204. In step S204, the CPU 401 determines the type of the printing medium to be used for printing. The type of the printing medium is determined by the designation performed by the user. For example, the type of a print target printing medium is designated via the display unit or the operation unit of the printing apparatus 1 before the processing illustrated in FIG. 5 is started, and the designated type is referred to in step S204. Alternatively, before the processing illustrated in FIG. 5 is started, a selection screen of a print function may be displayed on the display unit of the printing apparatus 1, and the type of a printing medium suitable for the selected print function may be determined in step S204. Alternatively, if the printing illustrated in FIG. 5 is executed based on a printing job received from an external device of the printing apparatus 1, in step S204, a print setting in the printing job may be referred to, and the type of a printing medium suitable for the print setting may be determined. In the present exemplary embodiment, in step S204, the type of a print target printing medium is determined to be any one of an "optical disc", a "card", and "other printing media". Then, the CPU 401 executes printing suitable for the determined type of the printing medium. The description will now be given of a case where the type of the printing medium is determined to be a "card".

<Case Where Printing Medium is Card>

Printing onto a card will be described with reference to the flowchart illustrated in FIG. 12.

In the present exemplary embodiment, the two cards 59A and 59B are placed on the card mount 56 as illustrated in FIG. 4D. In a case where a card in a standard size (e.g., 53.98 mm×85.6 mm) is arranged in a range substantially the same as a print range of the above-described disc, an upper limit of the number of cards is two, and furthermore, an interval between the two cards 59A and 59B needs to be made narrow. Thus, the interval between the cards 59A and 59B becomes narrow, and an acceptable amount of a print shift in the main-scanning direction of the carriage 31 is smaller than that in a sub-scanning direction (conveyance direction). For this reason, in the printing operation to be described with reference to FIG. 12, as a determination method of a printing position in the main-scanning direction, a method with higher accuracy than that of a determination method of a printing position in the sub-scanning direction is used.

Figure 12:
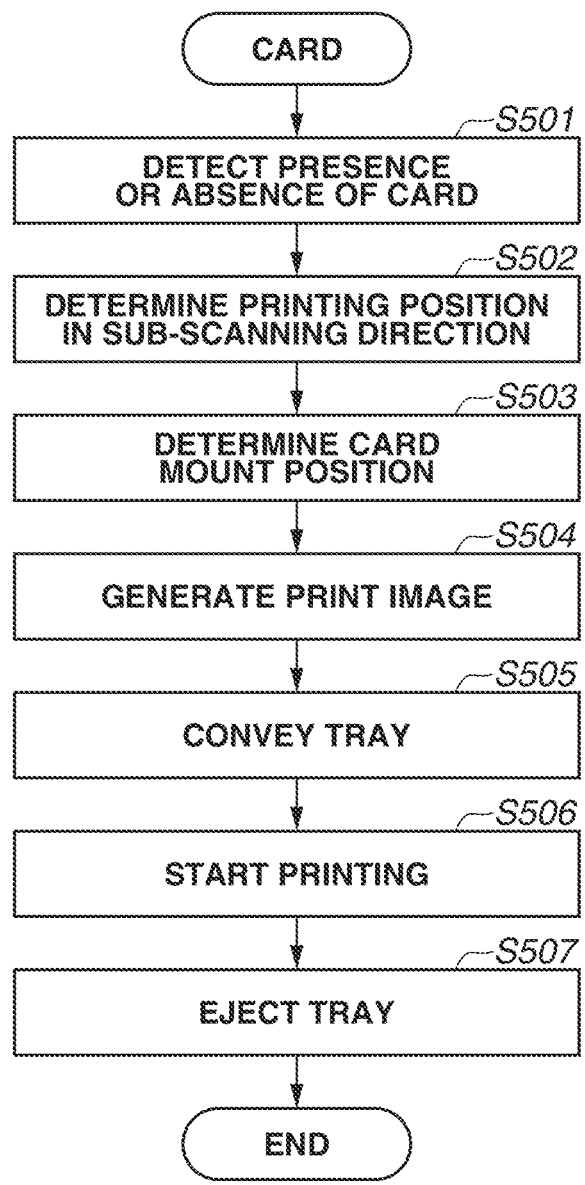
FIG. 12 is a flowchart illustrating processing in card printing.

FIG. 12 is a flowchart illustrating processing in card printing.

In step S501, the CPU 401 performs card presence or absence detection. In step S502, the CPU 401 calculates a position in the sub-scanning direction at which printing is started. In step S503, the CPU 401 performs determination of a position of a card mount to determine a position of a card mount. Details of the card presence or absence detection in step S501 will be described below. In step S502, the CPU 401 determines a printing position in in the sub-scanning direction based on the center position C1 of the first reflection portion 47A that has been acquired in the first reflection portion detection (step S107) and the center position C2 of the second reflection portion 47B that has been acquired in the second reflection portion detection (step S110). In contrast to this, the CPU 401 determines a printing position in the main-scanning direction in which an allowable amount of a print shift is relatively small, using a result obtained by a sensor directly detecting the card mount 56 in step S503. Details of the processing in step S503 will be described below.

Next, in step S504, the CPU 401 generates a print image based on received printing data and the determined position of the card, based on the result obtained in the determination of the position of the card mount (step S503). Specifically, the CPU 401 generates a print image so that a print target image is printed at the position of the card. The processing of print image generation (step S504) will be described in detail below. Subsequently, in step S505, the CPU 401 controls the conveyance motor 20 to convey the tray 3 so that the card mount moves to the printing position set based on the position determined in step S503. Then, by controlling the carriage motor 15 based on the position determined in step S504, the CPU 401 moves the printing head 12 in the main-scanning direction. Then, in step S506, through print control of the head driver 440, the CPU 401 causes the printing head 12 to start printing. When the printing (step S506) ends, in step S507, the CPU 401 controls the conveyance motor 20 to eject the tray 3 to the outside of the main body, and ends the processing.

The card presence or absence detection operation in step S501 of FIG. 5 will now be described in detail. When card printing is to be executed, an operator needs to set one or both of the cards 59A and 59B on the card mount 56. Thus, it is necessary to detect whether the cards 59A and 59B are set.

As described above, FIG. 4C illustrates a state in which the card mount 56 on which no card is set is set on the tray 3, and FIG. 4D illustrates a state in which the cards 59A and 59B are set on the card mount 56. The card mount 56 includes the detection holes 58A and 58B, and the surface of the tray 3 is exposed through the detection holes 58A and 58B on which the cards 59A and 59B are not placed. In the present exemplary embodiment, the tray 3 has a black color, and the cards 59A and 59B have a white color.

Figure 13:
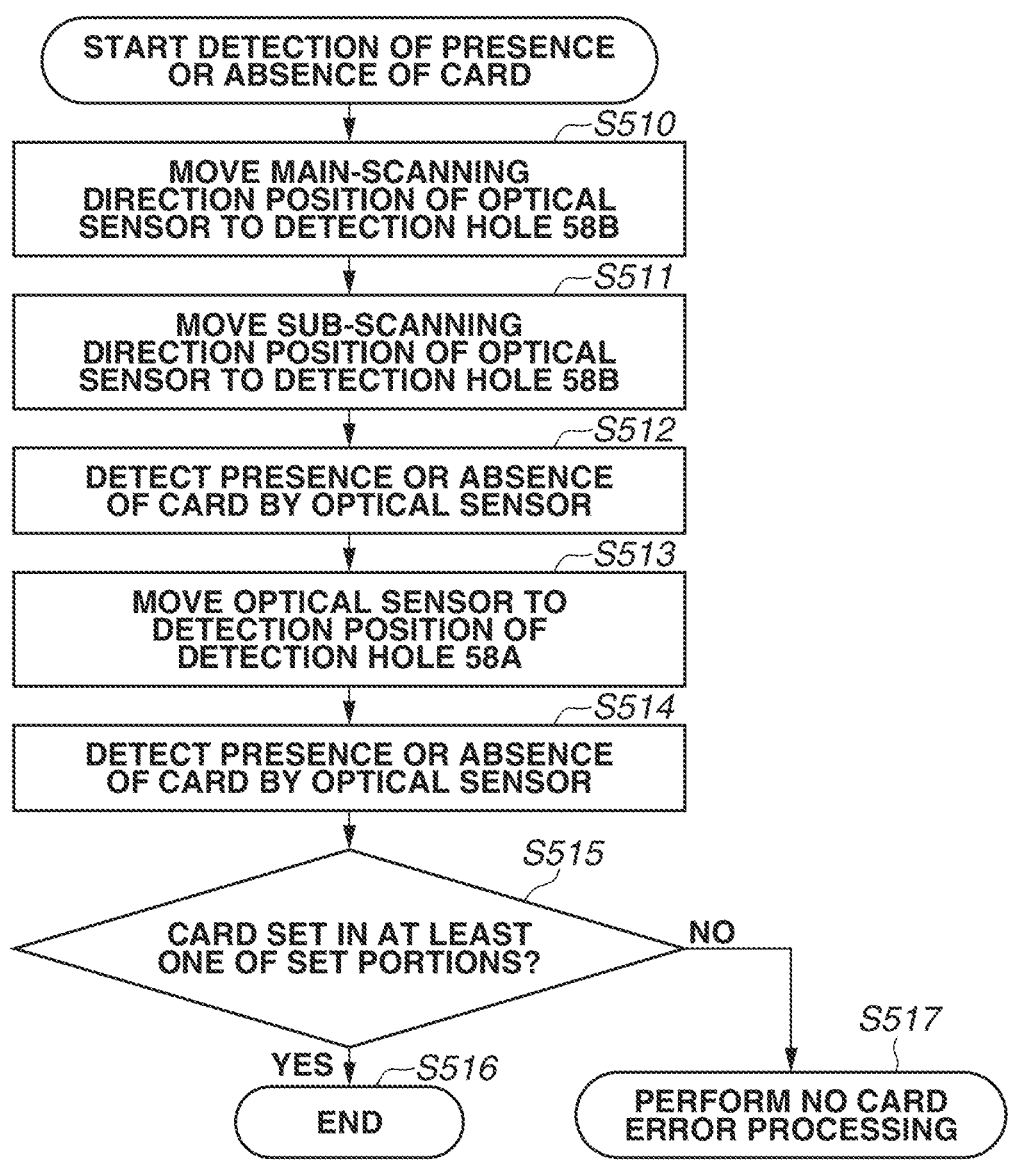
FIG. 13 is a flowchart illustrating processing of card presence or absence detection.
Figure 14:
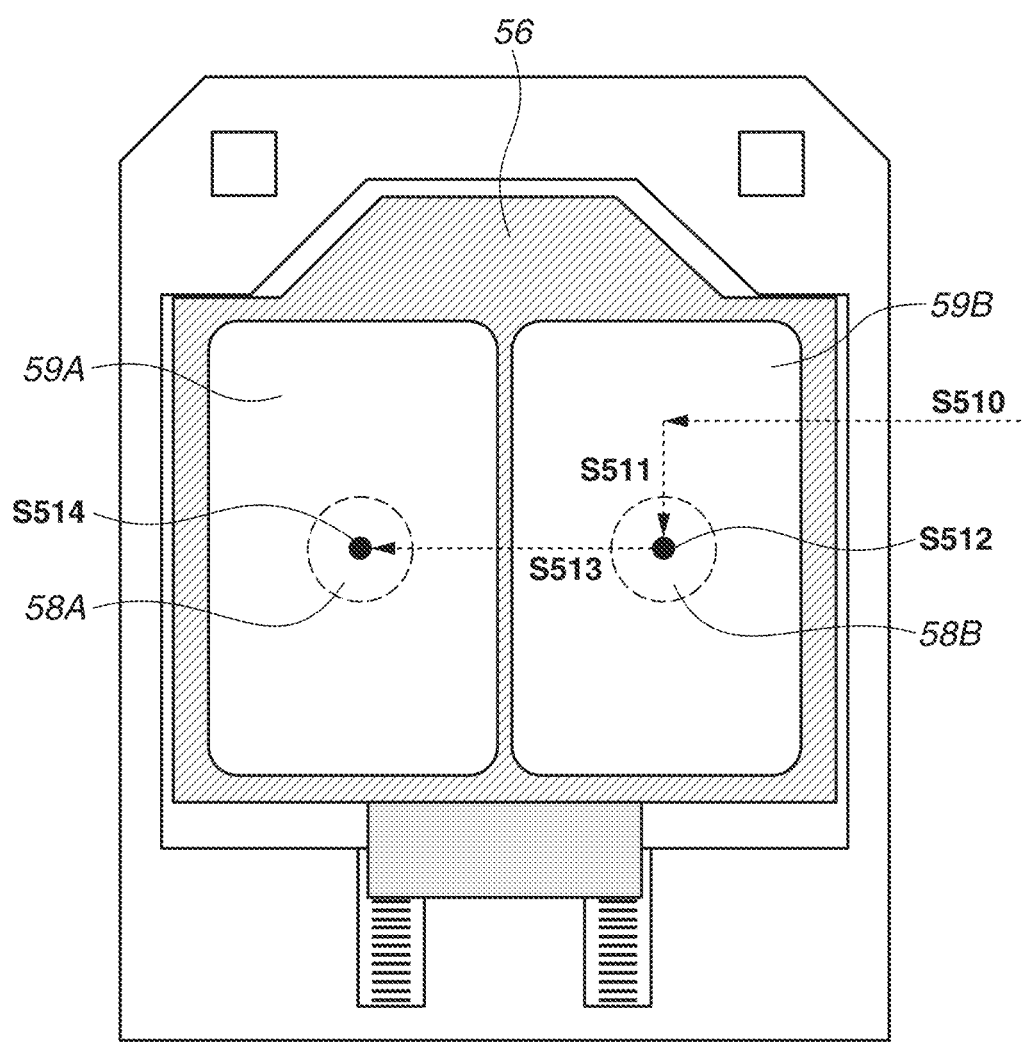
FIG. 14 is a diagram for illustrating an operation of card presence or absence detection.

FIG. 13 is a flowchart illustrating the processing of the card presence or absence detection, and FIG. 14 is a diagram for illustrating an operation of the card presence or absence detection. First, in step S510, the CPU 401 moves the carriage 31 based on position information about the first reflection portion 47A detected in the above-described first reflection portion detection (step S106) and the second reflection portion 47B detected in the second reflection portion detection (step S108). Specifically, the CPU 401 moves the carriage 31 so that the optical sensor 25A comes to a detection position in the main-scanning direction of the detection hole 58B. Furthermore, in step S511, the CPU 401 controls the conveyance motor 20 to move the tray 3 in the sub-scanning direction (conveyance direction) so that the detection hole 58B is placed immediately below the optical sensor 25A. Then, in step S512, the CPU 401 detects the presence or absence of the cards 59A and 59B based on a received light amount detected by the optical sensor 25A. Specifically, in a state in which the cards 59A and 59B having a white color are set, reflected light from the cards is received, and the received light amount detected by the optical sensor 25A becomes larger. On the other hand, in a case where the cards 59A and 59B are not set, the received light amount from the tray 3 having a black color becomes smaller than in a case where the cards 59A and 59B a are set. Thus, depending on whether a received light amount detected by the optical sensor 25A is large or small, whether the cards 59A and 59B are placed in the set portions 57A and 57B can be determined. For example, if the received light amount is larger than a predetermined threshold value, it is determined that the cards 59A and 59B are set.

Next, in step S513, the CPU 401 moves the carriage 31 so that the optical sensor 25A is placed at a detection position of a detection hole 58A. Then, in step S514, the CPU 401 detects whether the card 59A is set in the set portion 57A, similarly to step S512.

Subsequently, in step S515, the CPU 401 determines whether a card is set in at least one of the set portions 57A and 57B. If a card is set in at least one of the set portions 57A and 57B at a printing position (YES in step S515), the processing proceeds to step S516. On the other hand, if a card is set in neither the set portion 57A nor 57B (NO in step S515), the processing proceeds to step S517. In step S517, the CPU 401 stops the operation due to a no card error, performs an operation of ejecting the tray 3, and then notifies the user of the error.

In this example, the cards 59A and 59B have a white color and the tray 3 has a black color. However, a combination of colors is not limited to this, and another combination of colors may be employed in which a reflected light amount of the optical sensor 25A changes depending on the presence or absence of the cards 59A and 59B.

Next, a determination operation of a card mount position in step S503 of FIG. 12 will be described in detail. If it is determined in the card presence or absence detection (step S501) that at least one of the cards 59A and 59B is set at the printing position, the processing proceeds to the determination operation of the position of the card mount.

Figure 15:
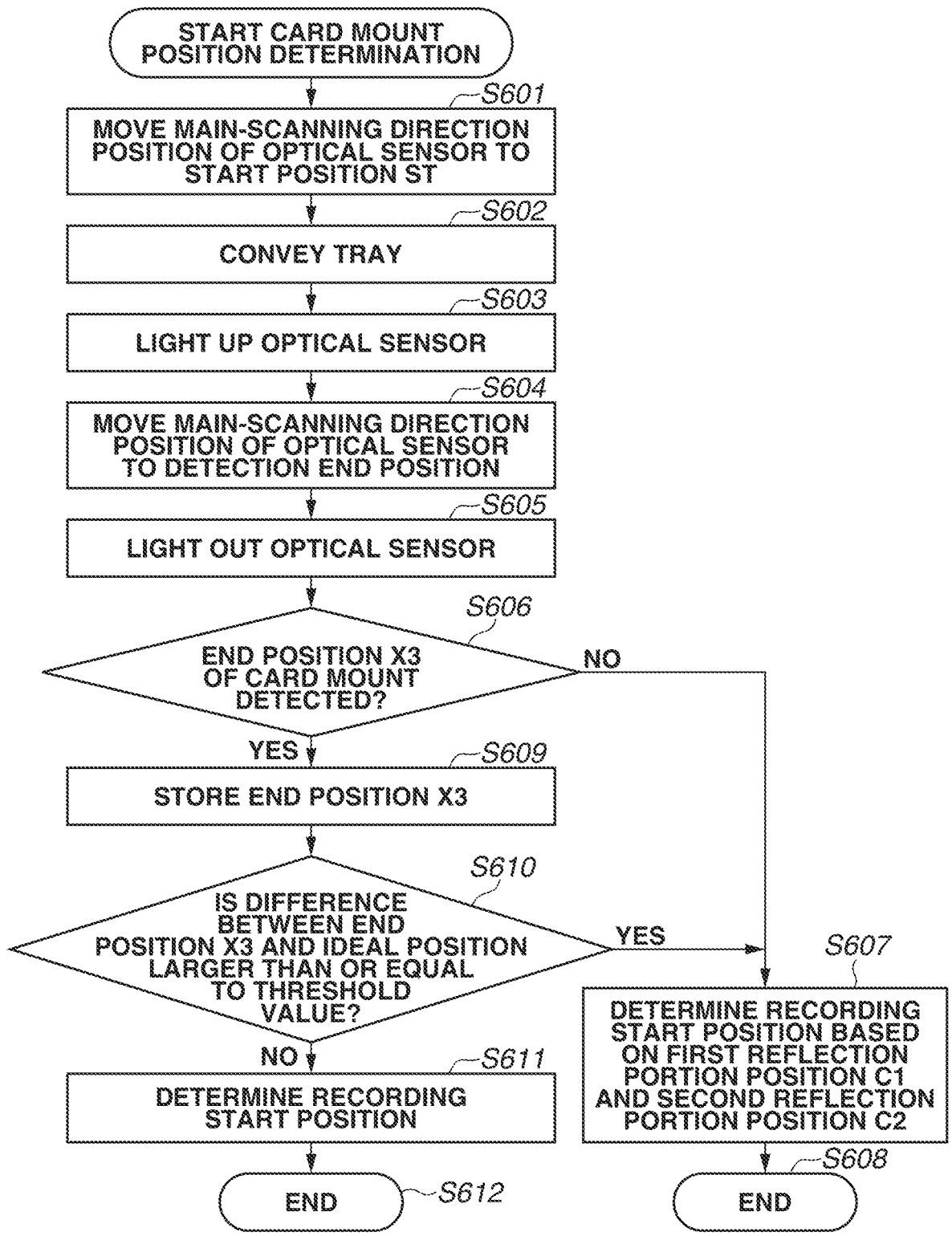
FIG. 15 is a flowchart illustrating a determination operation of a position of a card mount according to a first exemplary embodiment.
Figure 16:
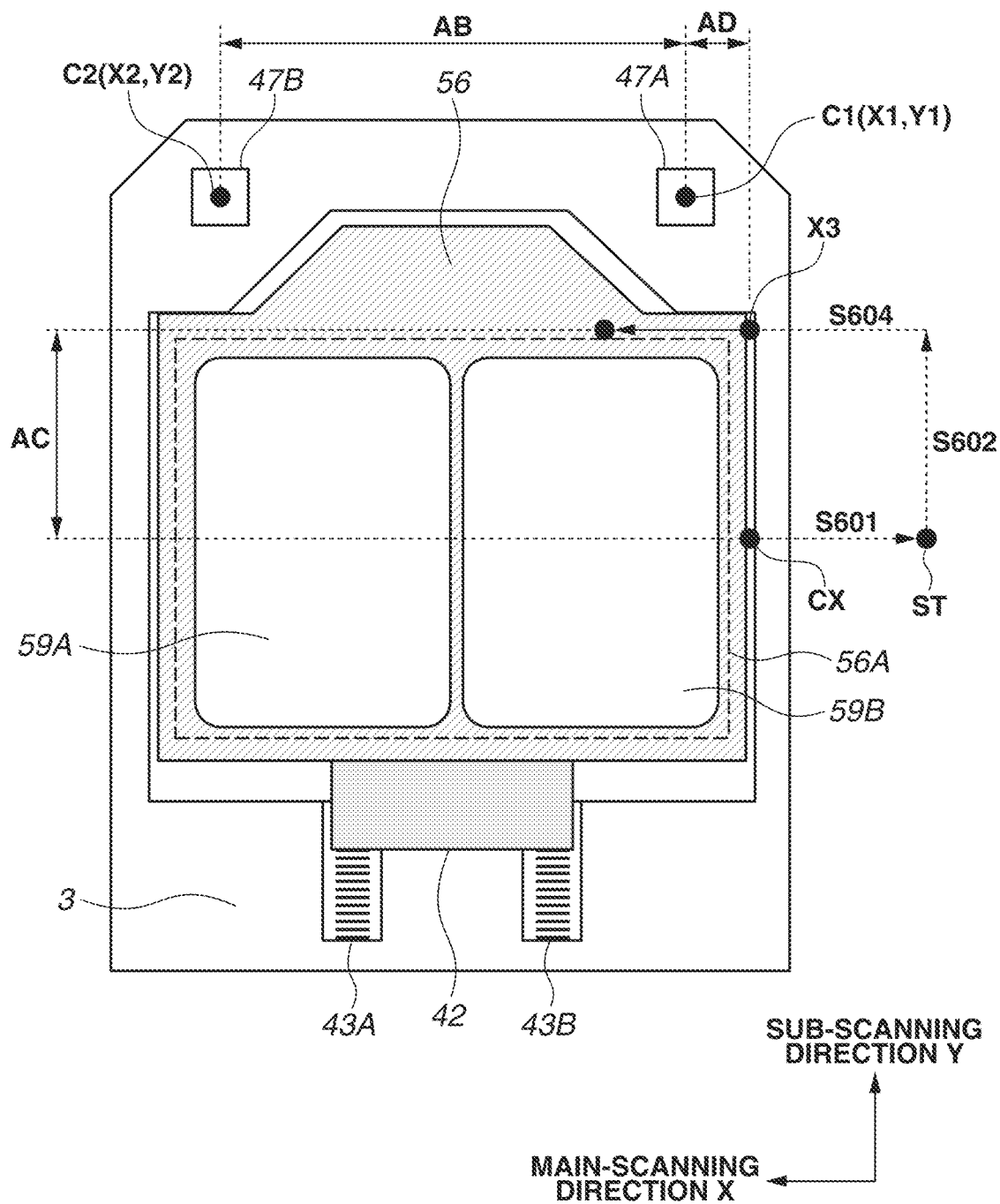
FIG. 16 is a diagram for illustrating the determination operation of the position of the card mount.

FIG. 15 is a flowchart illustrating the determination operation of the position of the card mount according to the present exemplary embodiment. FIG. 16 is a diagram for illustrating the determination operation of the position of the card mount according to the present exemplary embodiment. As described above, the determination operation of the position of the card mount is an operation of determining a position in the main-scanning direction of the card mount 56.

First, in step S601, the CPU 401 moves the carriage 31 in the main-scanning direction so that the position of the optical sensor 25A comes to a start position ST (illustrated in FIG. 16) distant from the card mount 56 by a predetermined amount in the main-scanning direction. Hereinafter, a coordinate in a two-dimensional space illustrated in FIG. 16 will be described. In the two-dimensional space, the start position ST is set as an origin. Next, in step S602, the CPU 401 controls the conveyance motor 20 to convey the tray 3 in the sub-scanning direction so that the position in the sub-scanning direction of the optical sensor 25A comes to a position expected to be an end position X3 illustrated in FIG. 16. Then, in step S603, the CPU 401 lights up the optical sensor 25A. Furthermore, in step S604, the CPU 401 moves the carriage 31 in the main-scanning direction (leftward in FIG. 16) by a distance required for detecting the end position X3, and ends the movement at a detection end position. The detection end position is desirably set to a position distant in the main-scanning direction from the end of the card mount 56 and a start position of the next operation. Then, if the optical sensor 25A reaches the detection end position, in step S605, the CPU 401 lights out the optical sensor 25A. At this time, a received light amount of the optical sensor 25A from the card mount 56 having a white color is larger than a received light amount of the optical sensor 25A from the tray 3 having a black color. Thus, depending on whether a received light amount detected by the optical sensor 25A is large or small, the CPU 401 can detect the end position X3 in the X direction of the card mount 56.

Next, in step S606, the CPU 401 determines whether the end position X3 of the card mount 56 has been detected. If the end position X3 has not been detected (NO in step S606), the CPU 401 determines that the end position X3 is not accurately detected, and the processing proceeds to step S607. In step S607, the CPU 401 determines a recording start position based on the center position C1 of the first reflection portion 47A and the center position C2 of the second reflection portion 47B. Then, in step S608, the CPU 401 ends the determination operation of the position of the card mount. On the other hand, if the end position X3 has been detected (YES in step S606), the processing proceeds to step S609. In step S609, the CPU 401 stores the end position X3 in the RAM 405. Next, in step S610, the CPU 401 determines whether a difference between the detected end position X3 and an ideal position is larger than or equal to a threshold value. The ideal position of the end position X3 is determined by the CPU 401 to be a position distant by an ideal distance AD (rightward in FIG. 16) from an X direction coordinate X1 of the center position C1 of the first reflection portion 47A. The ideal distance AD is defined at the time of manufacturing of the tray 3 and the card mount 56. Such distances are prestored in the ROM 403, and the CPU 401 refers to the distances. If a difference between the end position X3 detected by the optical sensor 25A and the ideal position of the end position X3 is larger than or equal to the threshold value (YES in step S610), the processing proceeds to step S607. In step S607, the CPU 401 determines that the end position X3 is not accurately detected, and the CPU 401 determines the recording start position based on the center position C1 of the first reflection portion 47A and the center position C2 of the second reflection portion 47B. Then, in step S608, the CPU 401 ends the card mount position determination operation.

On the other hand, if the difference between the end position X3 detected by the optical sensor 25A and the ideal position of the end position X3 is smaller than the threshold value (NO in step S610), the processing proceeds to step S611. In step S611, the CPU 401 determines that the end position X3 is accurately detected, and the CPU 401 determines the recording start position based on the center position C1 of the first reflection portion 47A, the center position C2 of the second reflection portion 47B, and the end position X3 detected by the optical sensor 25A. Specifically, a change amount H of the recording start position is calculated from a shift amount Z in the X direction of the card mount 56 and an inclination shift amount K attributed to a skew caused in conveying the tray 3. The shift amount Z of the card mount 56 is obtained from a difference between an X-coordinate of the ideal position of the end position X3 and an X-coordinate of the end position X3 detected by the optical sensor 25A. The ideal position of the end position X3 is a point distant from the X direction coordinate X1 of the center position C1 of the first reflection portion 47A by the ideal distance AD illustrated in FIG. 16 (rightward in FIG. 16). In other words, when the X-coordinate of the end position X3 detected by the optical sensor 25A is denoted by X3, the shift amount Z can be determined by the expression: shift amount $Z=X3-(X1-AD)$.

On the other hand, the inclination shift amount K being a value corresponding to the inclination of the tray 3 can be determined by the following expression: inclination shift amount $K=\text{distance } AC \times (Y2-Y1)/\text{distance } AB$. The distance AC is a distance between the center position in the Y direction of the cards 59A and 59B and the ideal position of the end position X3. The center position in the Y direction of the cards 59A and 59B is a predefined ideal position. In other words, the distance AC is a fixed distance serving as an ideal distance. Similarly, the distance AB is an ideal distance between the center position C1 and the center position C2. Accordingly, the inclination shift amount K is obtained as a product of a distance (Y2−Y1) in the Y direction between the detected center position C1 and the center position C2 and the distance AB/distance AC serving as a reference fixed inclination. If the tray 3 is not inclined, $Y1=Y2$ is obtained, and the inclination shift amount K is 0.

The CPU 401 determines the recording start position based on the shift amount Z in the X direction of the card mount 56 and the inclination shift amount K attributed to the skew caused in conveying the tray 3. According to the present exemplary embodiment, the printing apparatus 1 receives data including both of an image to be printed onto the card 59A and an image to be printed onto the card 59B, and prints the data. Then, for example, the printing apparatus 1 prints the data from a position corresponding to a lower right end of the card mount 56 in FIG. 16 toward the upper left. At this time, a position near the lower right end of the card mount 56 is defined as a reference position of the recording start position. In step S611, the reference position is corrected based on the shift amount Z in the X direction of the card mount 56 and the inclination shift amount K attributed to the skew caused in conveying the tray 3.

If the recording start position is determined in step S611, in step S612, the CPU 401 ends the determination operation of the position of the card mount.

Through the above-described processing, the processing in step S503 of FIG. 12 (determination of the position of the card mount) ends. Next, in step S504, the CPU 401 performs generation of a print image. The generation of a print image is an operation of generating a print image to be printed onto a card installed on a card mount, from received data.

Figure 17:
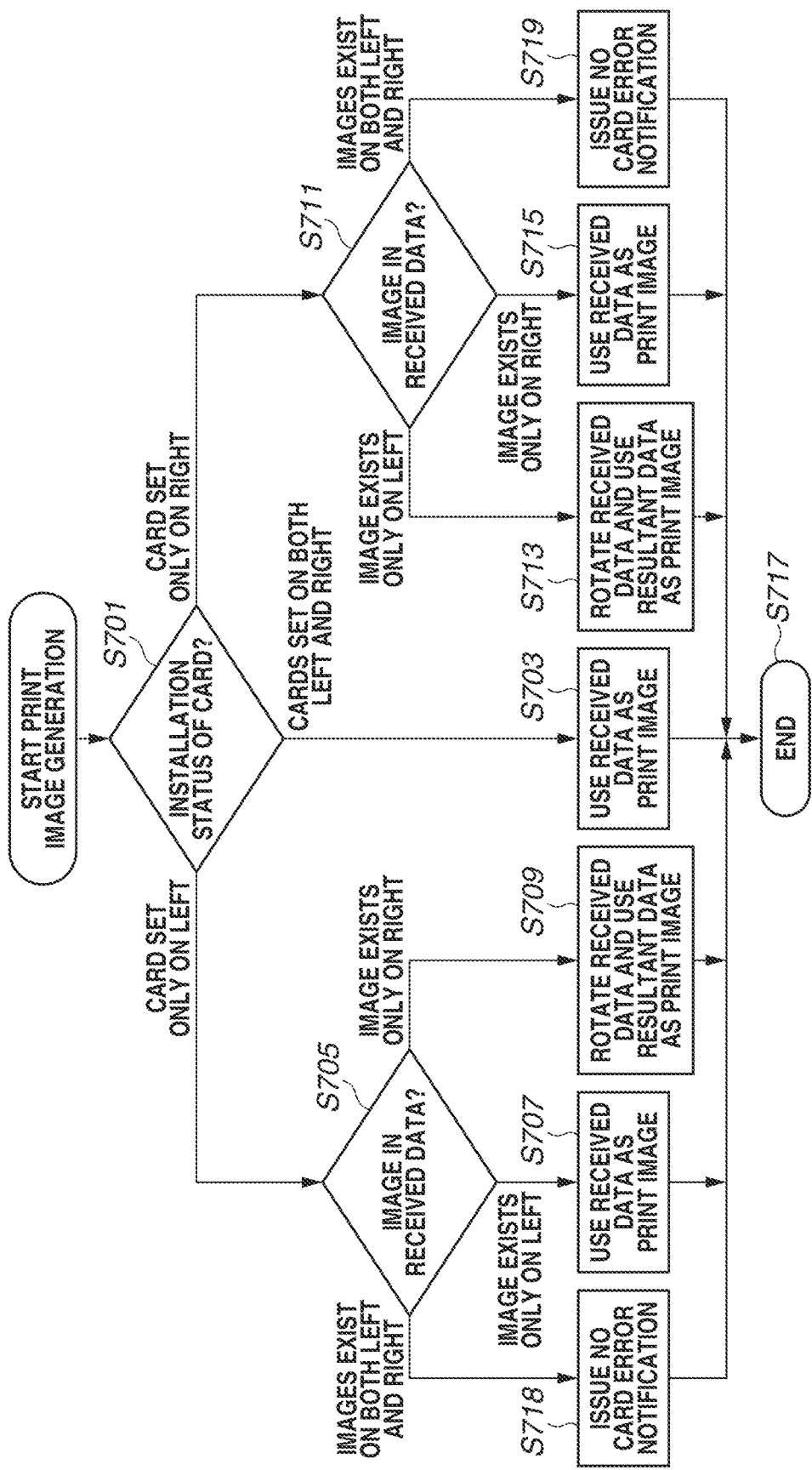
FIG. 17 is a flowchart illustrating print image generation.
Figure 18A:
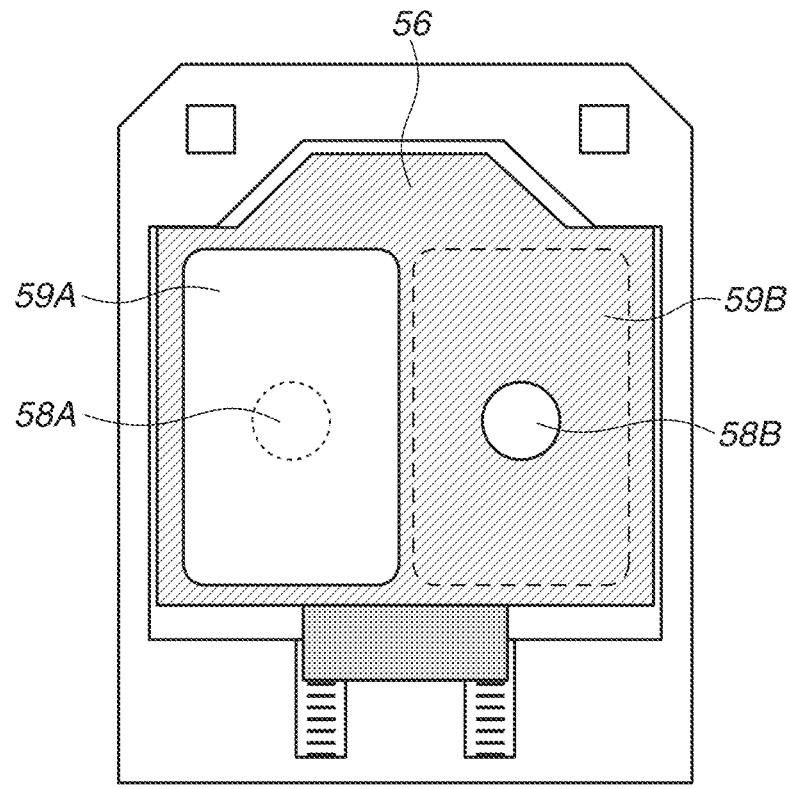
FIGS. 18A and 18B are diagrams each illustrating an example of card arrangement.
Figure 18B:
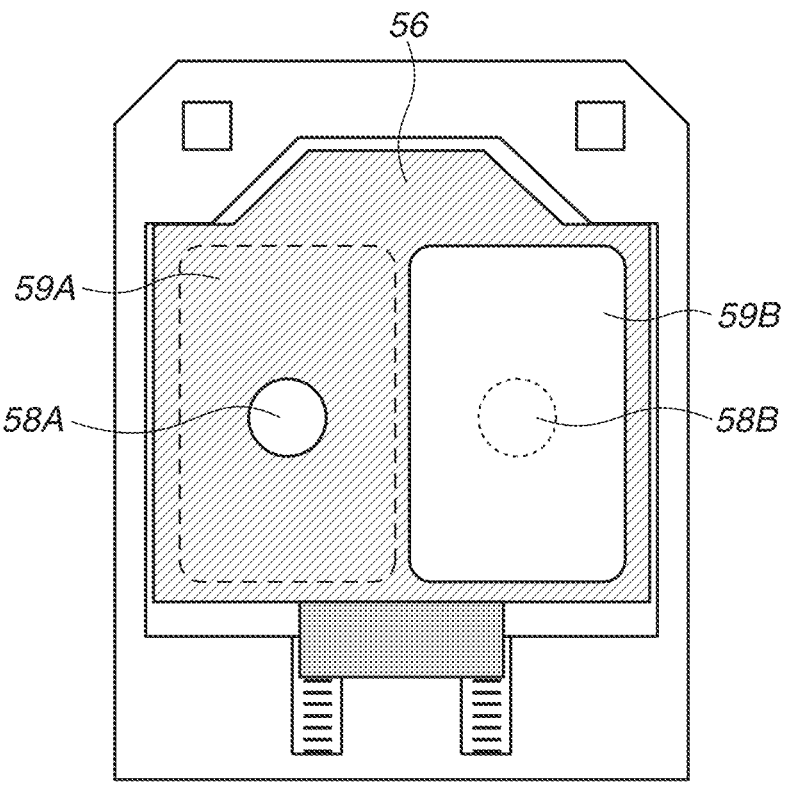

FIG. 17 is a flowchart illustrating the print image generation in step S504 according to the present exemplary embodiment. FIGS. 18A and 18B each illustrate an example of card arrangement. FIG. 18A illustrates an arrangement diagram in which the card 59A is placed only on the left side, and FIG. 18B illustrates an arrangement diagram in which the card 59B is placed only on the right side. Since an arrangement diagram in which both of the cards 59A and 59B are placed is illustrated in FIG. 4D, the arrangement diagram is omitted. A case is cited where received data is data for printing an image only onto one card, and a card is set only in one of the set portions 57A and 57B that is different from a set portion onto which the image is to be printed. In this case, printing is performed only onto the set portion in which a card is not set. Thus, in the present exemplary embodiment, a print image used for printing onto the set portion in which a card is set is generated by rotating print target data in the above-described case.

In the present exemplary embodiment, a printing job received by the printing apparatus 1 from an external device such as a personal computer (PC) or a smartphone by wired communication or wireless communication includes printing data including two regions corresponding to two cards. Specifically, in the printing data, two regions corresponding to the set portions 57A and 57B are symmetrically arranged, and the external device can include a print target image in each (or either) of the two regions. In the present exemplary embodiment, the printing data is rotated about a central point of the printing data. The external device creates the printing data so that left and right regions (regions corresponding to the set portions 57A and 57B) of the printing data match opposite regions by 180-degree rotation.

An acquisition method of the printing data is not limited to the reception of a printing job, and another acquisition method may be employed. For example, the above-described printing data may be created by reading images from a memory such as an internal memory of the printing apparatus 1 or a memory card attached to the printing apparatus 1 by an operation performed by the user on the printing apparatus 1. Also in this case, the above-described image rotation (or image movement to be described below) is executed on the printing data. In the descriptions below, the set portions on the card mount 56 will be described as a "right side" and a "left side" set portions, which correspond to the sides in a left-right direction illustrated in FIGS. 18A and 18B. Furthermore, positions of images in the printing data will also be indicated as "right" and "left", which respectively correspond to a "position at which an image is printed onto the right side set portion" and a "position at which an image is printed onto the left side set portion".

Figure 19A:
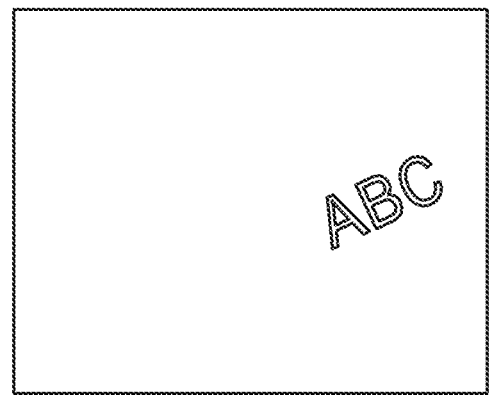
FIGS. 19A, 19B, 19C, and 19D are diagrams for illustrating generation of a print image by rotation of data.

FIGS. 19A, 19B, 19C, and 19D are diagrams for illustrating the generation of a print image by rotation of data. FIG. 19A illustrates printing data in which a print target image exists only on the right side. A rectangle in FIG. 19A represents printing data. The printing data is printing data corresponding to a region on the card mount 56 that includes two set portions in which cards can be set. In the printing data, a white region indicates a non-printing region, and printing is not actually performed in the white region.

Figure 19B:
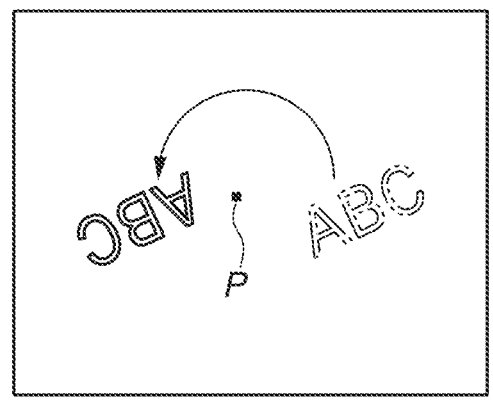

In FIG. 19A, only an image to be printed onto the set portion 57B provided on the right side of the card mount 56 is included in the printing data. Thus, if the user makes a mistake in a set position of a card, and the card is set only in the set portion 57A, printing is not executed onto the card, and the printing is executed onto the set portion 57B in which no card is set. Thus, in the present exemplary embodiment, in such a case, the printing data is rotated as illustrated in FIG. 19B. In the present exemplary embodiment, the printing data is rotated about a central point P of the printing data 180 degrees counterclockwise, and a print image to be printed is generated based on the printing data. Thus, printing is performed onto the set portion 57A on the left side in which the card is set.

Figure 19C:
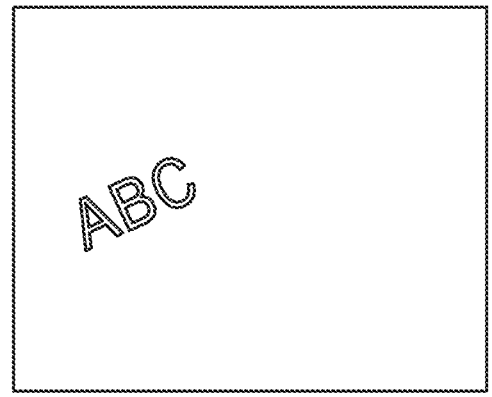
Figure 19D:
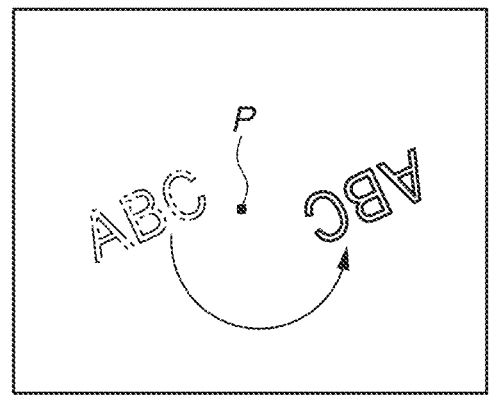

On the other hand, FIG. 19C illustrates printing data in which a print target image exists only on the left side. In this example, in contrast to the above-described example, a card is set only in the set portion 57B provided on the right side of the card mount 56. In such a case, in the present exemplary embodiment, the printing data is rotated about the central point P of the printing data 180 degrees counterclockwise as illustrated in FIG. 19D.

The processing described with reference to FIGS. 19A, 19B, 19C, and 19D will be described in detail with reference to the flowchart illustrated in FIG. 17. In step S701, the CPU 401 determines the presence or absence of a card in each of the set portion 57A (left side) and the set portion 57B (right side) based on a result of the card presence or absence detection in step S501. If cards are set on both of the left and right set portions, the image is printed on a card whichever side of printing data includes an image (or if both sides include images). Thus, if it is determined in step S701 that cards are set on both of the left and right sides ("CARDS SET ON BOTH LEFT AND RIGHT" in step S701), the processing proceeds to step S703. In step S703, the CPU 401 uses the received printing data as a print image as-is. Then, in step S717, the CPU 401 ends the processing.

If it is determined in step S701 that a card is set only in the left side set portion as illustrated in FIG. 18A ("CARD SET ONLY ON LEFT" in step S701), the processing proceeds to step S705. In step S705, the CPU 401 determines a position at which an image exists in the printing data from coordinate data in the received printing data. If it is determined that images exist on both of the left and right sides of the printing data ("IMAGES EXIST ON BOTH LEFT AND RIGHT" in step S705), to prevent an image from being printed onto the right side set portion in which no card is set, the processing proceeds to step S718. In step S718, the CPU 401 ends the processing due to a "no card error" without performing the printing. In the case of the no card error, for example, a message indicating that a card is not set is displayed on the display unit of the printing apparatus 1. At this time, the set portion in which a card is set or the set portion in which a card is not set may be displayed together with the message.

If it is determined in step S705 that an image exists only on the left side of the printing data ("IMAGE EXISTS ONLY ON LEFT" in step S705), because the printing data and a card set status are consistent, the processing proceeds to step S707. In step S707, the CPU 401 uses the received printing data as a print image. Then, in step S717, the CPU 401 ends the processing. If it is determined that the printing data includes an image only on the right side as illustrated in FIG. 19A ("IMAGE EXISTS ONLY ON RIGHT" in step S705), the processing proceeds to step S709. In step S709, the CPU 401 performs the rotation processing of the printing data as illustrated in FIG. 19B, and uses the resultant data as a print image. Then, in step S717, the CPU 401 ends the processing.

If it is determined in step S701 that a card is set only on the right side as illustrated in FIG. 18B ("CARD SET ONLY ON RIGHT" in step S701), the processing proceeds to step S711. In step S711, the CPU 401 determines a position in the printing data at which an image exists, similarly to step S705. If it is determined that images exist on both of the left and right sides of the printing data ("IMAGES EXIST ON BOTH LEFT AND RIGHT" in step S711), the processing proceeds to step S719. In step S719, the CPU 401 ends the processing due to the "no card error" without performing the printing, similarly to step S718. If it is determined in step S711 that an image exists only on the right side of the printing data ("IMAGE EXISTS ONLY ON RIGHT" in step S711), the processing proceeds to step S715. In step S715, the CPU 401 uses the received printing data as a print image, similarly to step S707. Then, in step S717, the CPU 401 ends the processing, similarly to step S707. If it is determined that the printing data includes an image only on the left side as illustrated in FIG. 19C ("IMAGE EXISTS ONLY ON LEFT" in step S711), the processing proceeds to step S713. In step S713, the CPU 401 performs the rotation processing of the printing data as illustrated in FIG. 19D, and uses the resultant data as a print image. Then, in step S717, the CPU 401 ends the processing.

As described above, the generation of a print image in step S504 of FIG. 12 ends. Based on the inclination shift amount K attributed to the skew caused in conveying the tray 3 that has been obtained in the above-described manner, the orientation of the print image generated in step S504 may be corrected to suit the skew. In other words, the print image may be rotated based on the inclination shift amount K (i.e., based on the inclination of the cards 59A and 59B).

Next, in step S505, the CPU 401 conveys the tray 3 to a recording start position. In step S506, the CPU 401 performs printing of the print image generated in step S504, at the set recording start position. In step S507, the CPU 401 ejects the tray 3 to the outside of the main body, and ends the printing operation.

Printing is not performed in the white region in the print images illustrated in FIGS. 19A, 19B, 19C, and 19D. Thus, in the processing illustrated in FIG. 17, even if the user sets a card in a wrong set portion in a case where the user wants to execute printing onto only one card, the printing can be executed onto the card by the above-described rotation processing. In this case, since resetting of a card or recreation of the printing data by the user is not necessary, it is possible to simplify an operation for performing appropriate printing in a case where the user erroneously sets a printing medium onto a tray.

In the present exemplary embodiment, the description has been given of an example in which a card is arranged so that a long side direction of the card corresponds to the sub-scanning direction, but the card arrangement is not limited to this. A card may be arranged so that the long side direction of the card corresponds to the main-scanning direction. In such a case, a printing position in the main-scanning direction is calculated from positions of a first reflection plate and a second reflection plate on a tray, and a printing position in the sub-scanning direction is directly detected from an edge of a card mount.

The printing medium is not limited to a card. In a case where the printing medium includes a plurality of parts to be printed as in the case of the nail sticker 54, whether a sticker for each part is installed may be detected, and an image for a region corresponding to a part at which the sticker is not installed may be deleted from a print image. In the present exemplary embodiment, the reflective optical sensor 25A is used for detecting a print target such as the cards 59A and 59B and the nail sticker 54, but the detection method is not limited to this. The print target may be detected by extracting a feature point using a color image sensor.

In the present exemplary embodiment, a method of setting the tray 3 on the downstream side in the conveyance direction, conveying the tray 3 toward the upstream side, and executing printing has been described as a conveyance method of the tray 3. However, the conveyance method is not limited to this, and the tray 3 may be set on the upstream side of the first conveyance roller 13, and conveyed toward the downstream direction.

As described above, a print image is generated in view of information regarding a position at which the printing medium is set (arrangement state of the medium) and a position of an image in the printing data. With such a configuration, even if a medium is not installed in a part in which a print target image is to be printed, it is possible to perform appropriate printing by the determination made by a printer main body. It is also possible to prevent an image from being printed at a position unintended by the user. In addition, since the user does not have to perform a printing operation again, the convenience of the user is improved.

In the first exemplary embodiment, a print image suitable for a card installed state is generated by rotating the printing data based on position information about a card placed on the card mount, as an editing method for printing data. In a second exemplary embodiment, as another editing method for printing data, a method of moving an image in printing data instead of the rotation will be described. Hereinafter, redundant description of parts described in the first exemplary embodiment will be omitted.

Figure 20:
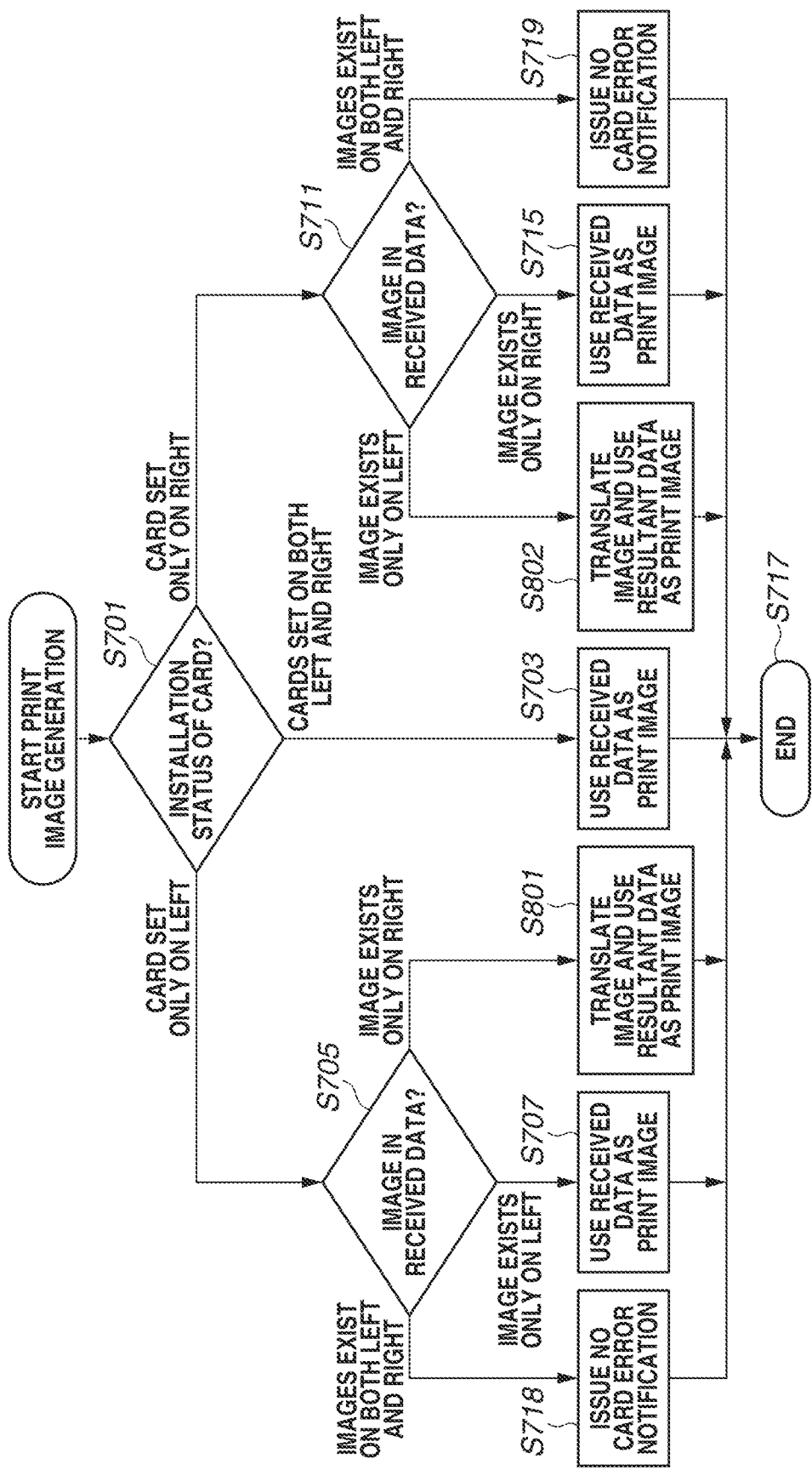
FIG. 20 is a flowchart illustrating another example of the print image generation.

FIG. 20 is a flowchart illustrating another example of the print image generation in step S504. Processing similar to the processing in FIG. 17 is denoted by the same step number, and the redundant description thereof will be omitted.

Processing in steps S801 and S802 is executed in place of the processing in steps S709 and S713 of FIG. 17. FIGS. 21A, 21B, 21C, and 21D are diagrams for illustrating parallel translation of an image according to the present exemplary embodiment.

Figure 21A:
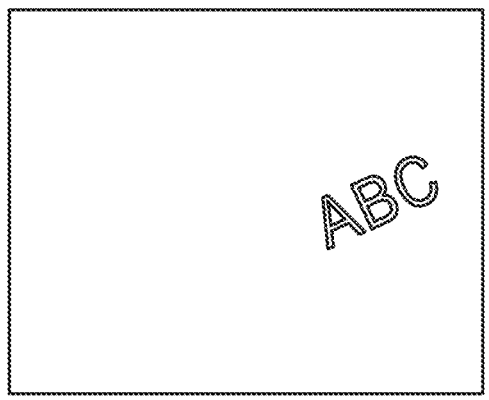
FIGS. 21A, 21B, 21C, and 21D are diagrams for illustrating parallel translation of an image.
Figure 21B:
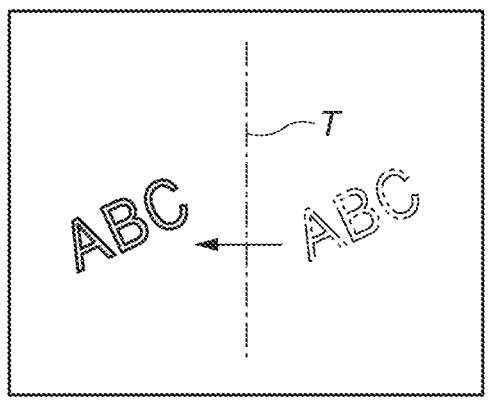

When the processing in step S801 is executed, a card is set only in the left set portion 57A ("CARD SET ONLY ON LEFT" in step S701). As illustrated in FIG. 21A, an image is included on the right side of printing data ("IMAGE EXISTS ONLY ON RIGHT" in step S705). Thus, in step S801, the CPU 401 translates the image included on the right side of the printing data to a position corresponding to the set portion 57A on the left side as illustrated in FIG. 21B.

Figure 21C:
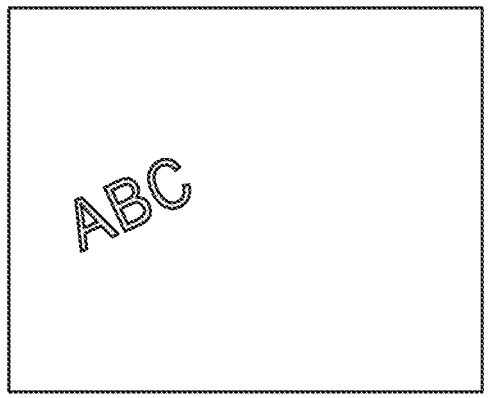
Figure 21D:
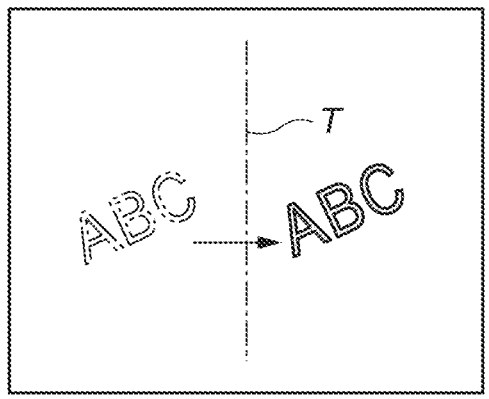

When the processing in step S802 is executed, a card is set only in the right set portion 57B ("CARD SET ONLY ON RIGHT" in step S701). As illustrated in FIG. 21C, an image is included on the left side of printing data ("IMAGE EXISTS ONLY ON LEFT" in step S711). Thus, in step S802, the CPU 401 translates the image included on the left side of the printing data to a position corresponding to the set portion 57B on the right side as illustrated in FIG. 21D.

Through the processing described with reference to FIGS. 20, 21A, 21B, 21C, and 21D, a print image is generated in view of information regarding a position at which the printing medium is set (arrangement state of the medium) and a position of an image in the printing data. With such a configuration, even if a medium is not installed in a part in which a print target image is to be printed, it is possible to perform appropriate printing by the determination made by a printer main body. It is also possible to prevent an image from being printed at a position unintended by the user. In addition, since the user does not have to perform a printing operation again, the convenience of the user is improved.

If a shape of a medium is not a vertically-symmetrical shape as in FIGS. 18A and 18B, a printing result becomes different by the rotation processing illustrated in FIGS. 19A, 19B, 19C, and 19D. However, the same printing result can be obtained by the parallel translation illustrated in FIGS. 21A, 21B, 21C, and 21D. If distances between two set portions and the central point of the printing data are different, if the rotation processing illustrated in FIGS. 19A, 19B, 19C, and 19D is performed, a printing position of an image on a card becomes different depending on the presence or absence of rotation. On the other hand, if the parallel translation illustrated in FIGS. 21A, 21B, 21C, and 21D is performed, an image can be translated to suit the position of the set portion. Furthermore, even if the number of set portions of media is three or more, appropriate printing can be implemented more easily by translating the image.

On the other hand, while the CPU 401 identifies a portion of an image in the printing data and adjusts the position thereof in the second exemplary embodiment, appropriate printing can be implemented, in the first exemplary embodiment, by the rotation of the entire the printing data without identifying the portion of the image. Thus, either the rotation processing in the first exemplary embodiment or the parallel translation processing in the second exemplary embodiment may be appropriately selected based on the shape or the type of a medium, or the processing capacity of the apparatus.

In the first and second exemplary embodiments, if images are included on both of the left and right sides of the printing data although a card is set only in one of the set portions, a no card error is determined (steps S718 and step S719 of FIGS. 17 and 20). In a third exemplary embodiment, the description will be given of processing for performing printing only onto a set portion in which a card is set in such a case. Specifically, the description will be given of processing for excluding an image corresponding to a set portion in which a card is not set from a print target.

Figure 22:
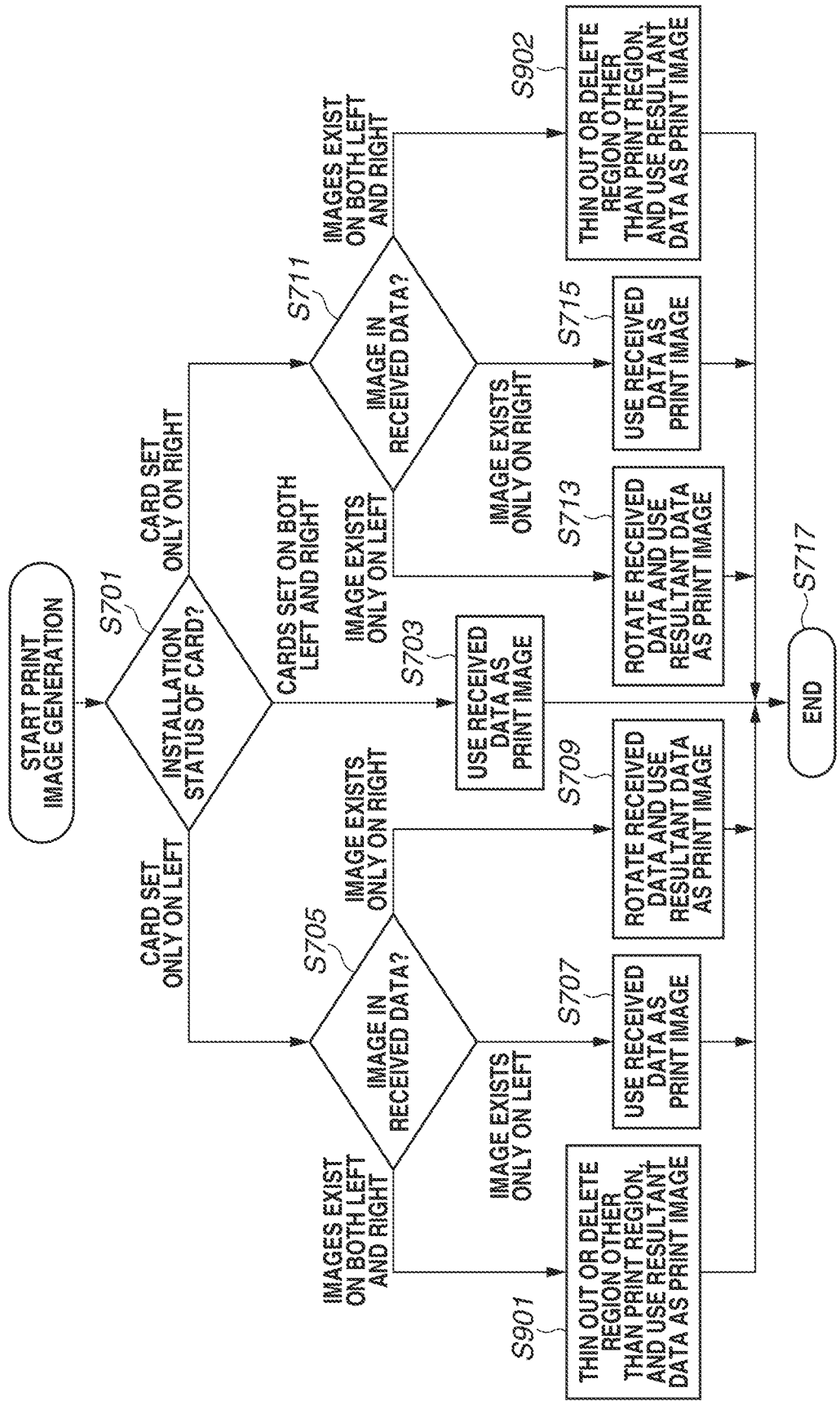
FIG. 22 is a flowchart illustrating another example of the print image generation.
Figure 23A:
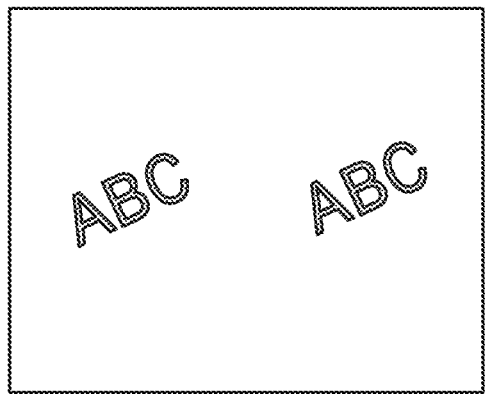
FIGS. 23A, 23B, and 23C are diagrams for illustrating processing of excluding an image from a print target.
Figure 23B:
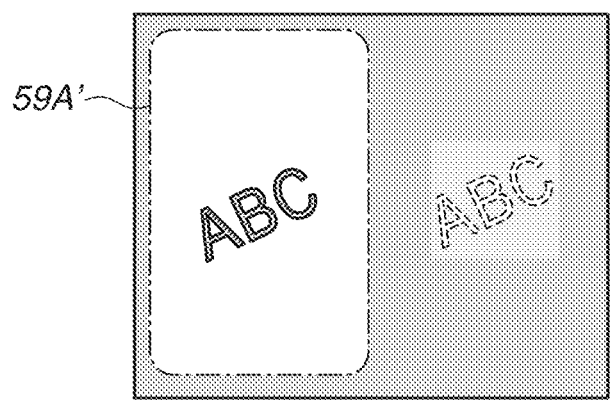
Figure 23C:
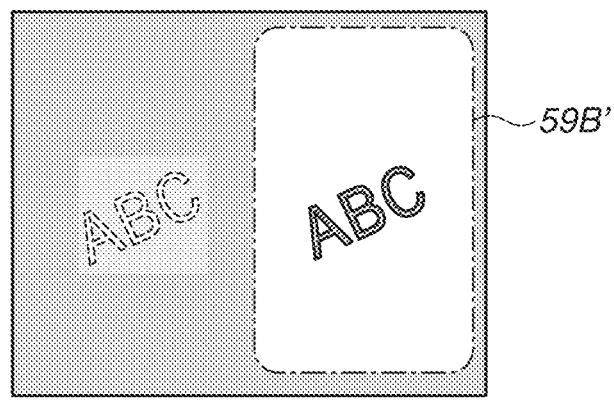

FIG. 22 is a flowchart illustrating another example of the print image generation in step S504. FIGS. 23A, 23B, and 23C are diagrams for illustrating processing of excluding an image from a print target. FIG. 23A illustrates printing data in which images are included on both of left and right sides. At this time, if a card is set only in the set portion 57A on the left side as illustrated in FIG. 23B, thinning processing or deletion processing of an image is performed on a region (gray region) other than a region 59A' corresponding to the set portion 57A. The thinning processing is processing of identifying a print target image ("ABC" in FIGS. 23B) in the region (gray region) other than the region 59A', and converting the image into non-printing data (e.g., white color). A portion originally having a white color in FIG. 23A is a non-printing region from the beginning. The deletion processing is processing of converting the entire region (gray region) other than the region 59A' into non-printing data (e.g., white color).

On the other hand, if a card is set only in the set portion 57B on the right side as illustrated in FIG. 23C, the thinning processing or the deletion processing is executed on a region (gray region) other than a region 59B'.

FIG. 22 is a flowchart illustrating another example of print image generation in step S504. Processing similar to the processing in FIG. 17 is denoted by the same step number, and the redundant description thereof will be omitted.

If a card is set only in the set portion 57A on the left side ("CARD SET ONLY ON LEFT" in step S701), and print target images are included on both of the left and right sides of the printing data ("IMAGES EXIST ON BOTH LEFT AND RIGHT" in step S705), the processing proceeds to step S901. In step S901, the CPU 401 executes the thinning processing or the deletion processing as illustrated in FIG. 23B. On the other hand, if a card is set only in the set portion 57B on the right side ("CARD SET ONLY ON RIGHT" in step S701), and print target images are included on both of the left and right sides of printing data ("IMAGES EXIST ON BOTH LEFT AND RIGHT" in step S711), the processing proceeds to step S902. In step S902, the CPU 401 executes the thinning processing or the deletion processing as illustrated in FIG. 23C.

The parallel translation processing in steps S801 and S802 that has been described with reference to FIG. 20 may be executed in place of the rotation processing in steps S709 and S713 of FIG. 22.

As described above, in the present exemplary embodiment, even if images are included on both of the left and right sides of the printing data although a card is set only in one set portion, printing can be performed onto the set portion in which the card is set.

The above-described printing data may be image data such as bitmap data or JPEG data, or may be printing data including an element such as an image or a text, and layout data indicating a layout of the element. The layout data is data described in a language such as a HyperText Markup Language (HTML), for example. In this case, for example, the above-described parallel translation is executed on an element arranged in a region indicated by the layout data. Alternatively, the above-described rotation processing is executed on the entire page corresponding to the layout data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present disclosure, appropriate printing can be executed even if the user erroneously sets a printing medium.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014080, filed Jan. 30, 2020, which is hereby incorporated by reference herein in its entirety.

What is claimed is:

1. A printing apparatus configured to print an image onto a recording medium, the printing apparatus comprising:
a determination unit configured to determine whether the recording medium is set in each of first and second set portions in which the recording medium is to be set;
an acquisition unit configured to acquire printing data including a first region corresponding to the first set portion and a second region corresponding to the second set portion;
an editing unit configured to edit, in a case where it is determined by the determination unit that the recording medium is set in the first set portion and the recording medium is not set in the second set portion and a print target image is not included in the first region and a print target image is included in the second region in the printing data acquired by the acquisition unit, the printing data so that the print target image included in the second region is printed onto the first set portion and is not printed onto the second set portion; and
a printing unit configured to perform printing based on the printing data edited by the editing unit.

2. The printing apparatus according to claim 1, wherein the editing unit executes rotation processing of the printing data so that the print target image included in the second region is printed onto the first set portion and is not printed onto the second set portion.

3. The printing apparatus according to claim 1, wherein the editing unit executes movement processing of moving the print target image in the printing data so that the print target image included in the second region is printed onto the first set portion and is not printed onto the second set portion.

4. The printing apparatus according to claim 1, wherein, in a case where it is determined by the determination unit that the recording medium is set in the first set portion and the recording medium is not set in the second set portion and print target images are included in both the first region and the second region, the editing unit further edits the printing data so that printing is executed onto the first set portion and printing is not executed onto the second set portion.

5. The printing apparatus according to claim 1,
    wherein the first set portion and the second set portion are provided on a tray, and
    wherein the printing unit conveys the tray and executes printing onto the recording medium set on the conveyed tray.

6. The printing apparatus according to claim 1, wherein the recording medium is a card.

7. A control method of a printing apparatus that prints an image onto a recording medium, the control method comprising:
    determining whether the recording medium is set in each of first and second set portions in which the recording medium is to be set;
    acquiring printing data including a first region corresponding to the first set portion and a second region corresponding to the second set portion;
    editing, in a case where it is determined by the determining that the recording medium is set in the first set portion and the recording medium is not set in the second set portion and a print target image is not included in the first region and a print target image is included in the second region in the printing data acquired by the acquiring, the printing data so that the print target image included in the second region is printed onto the first set portion and is not printed onto the second set portion; and
    causing the printing apparatus to perform printing based on the printing data edited by the editing.

\* \* \* \* \*